United States Patent
Esumi et al.

(10) Patent No.: US 8,805,159 B2
(45) Date of Patent: Aug. 12, 2014

(54) REPRODUCING DEVICE, CONTROL METHOD, AND RECORDING MEDIUM

(71) Applicants: Kenji Esumi, Tokyo (JP); Kiyoyasu Maruyama, Tokyo (JP)

(72) Inventors: Kenji Esumi, Tokyo (JP); Kiyoyasu Maruyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/681,032

(22) Filed: Nov. 19, 2012

(65) Prior Publication Data

US 2013/0243409 A1  Sep. 19, 2013

(30) Foreign Application Priority Data

Mar. 16, 2012  (JP) ................................. 2012-059584

(51) Int. Cl.
*H04N 5/932* (2006.01)

(52) U.S. Cl.
USPC .......................................... 386/219; 386/354

(58) Field of Classification Search
None
See application file for complete search history.

(56) References Cited

U.S. PATENT DOCUMENTS

| | | |
|---|---|---|
| 2003/0026342 A1 | 2/2003 | Horiike et al. |
| 2004/0088728 A1 | 5/2004 | Shimizu |
| 2004/0143624 A1 | 7/2004 | Kusano et al. |
| 2007/0003253 A1 | 1/2007 | Suzuki |
| 2007/0040890 A1 | 2/2007 | Morioka et al. |
| 2007/0292110 A1 | 12/2007 | Nishi et al. |
| 2009/0248914 A1* | 10/2009 | Choi et al. ....................... 710/33 |
| 2010/0272126 A1* | 10/2010 | Hattori et al. ................. 370/506 |

FOREIGN PATENT DOCUMENTS

| | | |
|---|---|---|
| JP | 2000-50231 A | 2/2000 |
| JP | 2002-297538 A | 10/2002 |
| JP | 2003-143602 A | 5/2003 |
| JP | 2004-140536 A | 5/2004 |
| JP | 2004-163778 A | 6/2004 |
| JP | 2006-73079 A | 3/2006 |
| JP | 2007-13714 A | 1/2007 |
| JP | 2007-189557 A | 7/2007 |
| JP | 2008-505510 A | 2/2008 |
| JP | 2008-154045 A | 7/2008 |
| JP | 4209176 B2 | 1/2009 |
| JP | 4316468 B2 | 8/2009 |
| WO | WO 2006/025489 A1 | 3/2006 |

* cited by examiner

*Primary Examiner* — William C Vaughn, Jr.
*Assistant Examiner* — Eileen Adams
(74) *Attorney, Agent, or Firm* — Birch, Stewart, Kolasch & Birch, LLP

(57) ABSTRACT

A reproducing device includes: one or more input source selectors for selecting content to reproduce; two or more decoding processors for decoding the content; two or more output controllers for reproducing and outputting the decoded content; an instruction reception unit for receiving a reproduction instruction specifying arbitrary content, to have the specified content reproduced and output by one of the output controllers; a reproducibility determiner for deciding, on a basis of usage conditions of the input source selectors and the decoding processors, whether or not the specified content can be reproduced with one of the decoding processors; a reproduction path determiner for designating, on a basis of the decision, which decoding processor and which output controller to use to reproduce the specified content; and a reproduction controller for using the designated decoding processor and output controller to reproduce the specified content.

19 Claims, 12 Drawing Sheets

| REPRODUCTION CHANNEL NO. | INPUT SOURCE SELECTOR | DECODING PROCESSOR | OUTPUT CONTROLLER | |
|---|---|---|---|---|
| 1 | 1ST INPUT SOURCE SELECTOR | 1ST DECODING PROCESSOR | 1ST OUTPUT CONTROLLER | ~401 |
| 2 | UNUSED | UNUSED | UNUSED | |
| 3 | UNUSED | UNUSED | UNUSED | |

| REPRODUCTION CHANNEL NO. | INPUT SOURCE SELECTOR | DECODING PROCESSOR | OUTPUT CONTROLLER | |
|---|---|---|---|---|
| 1 | 1ST INPUT SOURCE SELECTOR | 1ST DECODING PROCESSOR | 1ST OUTPUT CONTROLLER | |
| 2 | 2ND INPUT SOURCE SELECTOR | 2ND DECODING PROCESSOR | 2ND OUTPUT CONTROLLER | ~501 |
| 3 | UNUSED | UNUSED | UNUSED | |

FIG.6

| REPRODUCTION CHANNEL NO. | INPUT SOURCE SELECTOR | DECODING PROCESSOR | OUTPUT CONTROLLER |
|---|---|---|---|
| 1 | 1ST INPUT SOURCE SELECTOR | 1ST DECODING PROCESSOR | 1ST OUTPUT CONTROLLER |
| 2 | 2ND INPUT SOURCE SELECTOR | 2ND DECODING PROCESSOR | 2ND OUTPUT CONTROLLER |
| 3 | 2ND INPUT SOURCE SELECTOR | 2ND DECODING PROCESSOR | 3RD OUTPUT CONTROLLER |

FIG.7

| REPRODUCTION CHANNEL NO. | INPUT SOURCE SELECTOR | DECODING PROCESSOR | OUTPUT CONTROLLER |
|---|---|---|---|
| 1 | 1ST INPUT SOURCE SELECTOR | 1ST DECODING PROCESSOR | 1ST OUTPUT CONTROLLER |
| 2 | UNUSED | UNUSED | UNUSED |
| 3 | 2ND INPUT SOURCE SELECTOR | 2ND DECODING PROCESSOR | 3RD OUTPUT CONTROLLER |

FIG.10

PLAYLIST

| CONTENT C11 | SOLO ○ | SHARED ○ |
| CONTENT C12 | SOLO ○ | SHARED ○ |
| CONTENT C13 | SOLO ○ | SHARED ○ |
| CONTENT C14 | SOLO × | SHARED ○ |
| CONTENT C15 | SOLO × | SHARED ○ |
| CONTENT C16 | SOLO × | SHARED × |

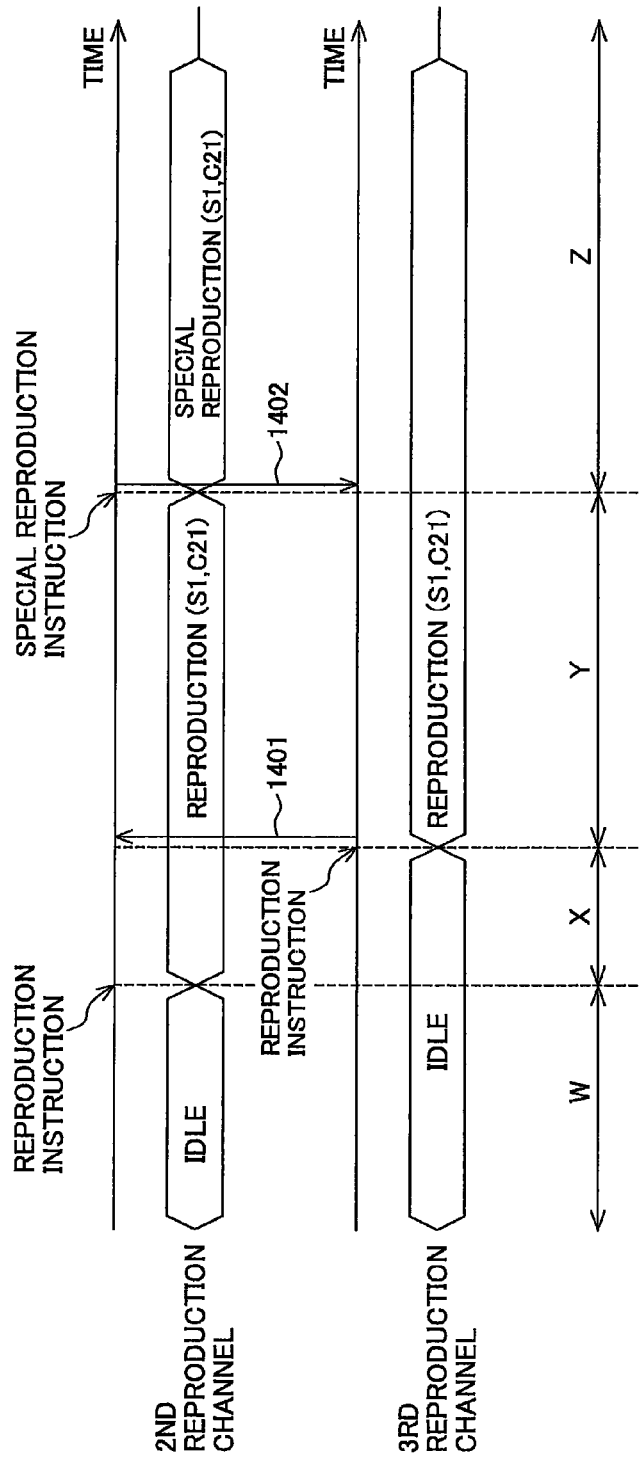

REPRODUCING DEVICE, CONTROL METHOD, AND RECORDING MEDIUM

BACKGROUND OF THE INVENTION

1. Field of the Invention

The present invention relates to a reproducing device, a control method for the reproducing device, and recording medium.

2. Description of the Related Art

The advanced functionality of the modern audio-video (AV) devices installed in automobiles requires support for many multimedia formats and many different types of sources, including nonvolatile memory devices such as hard disk drives (HDDs), secure digital (SD) cards, and universal serial bus (USB) memory devices, optical disc devices such as compact disc (CD), digital versatile disc (DVD), and Blu-ray disc (BD) players, portable audio players and portable AV media players, wireless networks such as wireless fidelity (WiFi) networks, and so on. There is also a growing need to provide separate AV content to the driver, the passenger in the front seat, and the passengers in the right back seat and left back seat.

In Japanese Patent Application Publication No. 2006-109329 (now Japanese Patent No. 4316468), Mamiya et al. describe a data reproduction system connected to one or more source devices and a plurality of output devices, reproducing an audio/video source so that it can be listened to or viewed at a plurality of output devices simultaneously. For each output device, the system has a selector for selecting and outputting one of source signals from the one or more source devices and a signal processor for processing the selected signal and sending the processed signal to the output device. The system also has a controller that controls the selectors and signal processors to reproduce the audio/video sources. For each output device, the controller records information indicating a stop position at which reproduction of the source stopped, and resumes the reproduction of the source from the stop position based on the recorded information.

SUMMARY OF THE INVENTION

In an aspect of the present invention, it is intended to provide a reproducing device, control method, and recording medium capable of reproducing and outputting content by a plurality of output controllers even if the number of decoding processors or input sources is limited.

According to an aspect of the present invention, there is provided a reproducing device for reproducing plural content supplied from one or more input sources. The reproducing device includes one or more input source selectors for selecting content to reproduce from among the plural content, a plurality of decoding processors for performing a decoding process on the content, a plurality of output controllers for reproducing and outputting the content after the decoding process. The reproducing device also includes: an instruction reception unit for receiving a reproduction instruction specifying arbitrary content from among the plural content, to have the specified content reproduced and output by one of the output controllers; a reproducibility determiner for making a decision, when the reproduction instruction is received, on a basis of usage conditions of the one or more input source selectors and the plurality of decoding processors, as to whether or not the specified content can be reproduced with one of the plurality of decoding processors; a reproduction path determiner for designating, on a basis of the decision made by the reproducibility determiner, which decoding processor and which output controller to use to reproduce the specified content; and a reproduction controller for using the decoding processor and the output controller designated by the reproduction path determiner to reproduce the specified content.

In one aspect of the reproducing device, when first content is already being reproduced by one of the plurality of decoding processors and the instruction reception unit receives a new reproduction instruction for second content, the reproducibility determiner decides whether or not the second content can be reproduced with another one of the decoding processors, differing from the decoding processor being used to reproduce the first content, and informs the reproduction path determiner of its decision. When the reproducibility determiner decides that the second content can be reproduced with the another one of the decoding processors, the reproduction path determiner designates the another one of the plurality of decoding processors as the decoding processor to use to reproduce the second content, and the reproduction controller performs the reproduction of the second content using the decoding processor thus designated.

In another aspect of the reproducing device, when first content is already being reproduced by one of the plurality of decoding processors and the instruction reception unit receives a new reproduction instruction for second content, the reproducibility determiner decides whether or not the second content can be reproduced with another one of the decoding processors, differing from the decoding processor being used to reproduce the first content, and informs the reproduction path determiner of its decision. When the reproducibility determiner decides that the second content cannot be reproduced with the another one of the decoding processors, the reproducibility determiner decides whether or not the second content is identical to the first content, and informs the reproduction path determiner of its decision.

According to another aspect of the present invention, there is provided a control method for a reproducing device for reproducing plural content supplied from one or more input sources. The reproducing device includes one or more input source selectors for selecting content to reproduce from among the plural content, a plurality of decoding processors for performing a decoding process on the content, and a plurality of output controllers for reproducing and outputting the content after the decoding process. The control method includes: receiving a reproduction instruction specifying arbitrary content from among the plural content, to have the specified content reproduced and output by one of the output controllers; deciding, on a basis of usage conditions of the one or more input source selectors and the plurality of decoding processors, whether or not the specified content can be reproduced with one of the plurality of decoding processors; designating, on a basis of the decision, which decoding processor and which output controller to use to reproduce the specified content; and using the designated decoding processor and the designated output controller to reproduce the specified content.

In one aspect of the control method, when first content is already being reproduced by one of the plurality of decoding processors and a new reproduction instruction for second content is received, the deciding includes deciding whether or not the second content can be reproduced with another one of the decoding processors, differing from the decoding processor being used to reproduce the first content. When it is decided that the second content can be reproduced with the another one of the decoding processors, the designating includes designating the another one of the plurality of decoding processors as the decoding processor to use to reproduce the second content.

In another aspect of the control method, when first content is already being reproduced by one of the plurality of decoding processors and a new reproduction instruction for second content is received, the deciding includes deciding whether or not the second content can be reproduced with another one of the decoding processors, differing from the decoding processor being used to reproduce the first content. When it is decided that the second content cannot be reproduced with the another one of the decoding processors, the deciding includes deciding whether or not the second content is identical to the first content.

According to still another aspect of the present invention, there is provided a machine-readable recording medium storing a control program for a reproducing device for reproducing plural content supplied from one or more input sources. The reproducing device includes one or more input source selectors for selecting content to reproduce from among the plural content, a plurality of decoding processors for performing a decoding process on the content, and a plurality of output controllers for reproducing and outputting the content after the decoding process. The control program includes: instructions for receiving a reproduction instruction specifying arbitrary content from among the plural content and specifying one of the plurality of output controllers, in order to have the specified output controller reproduce and output the specified content; instructions for deciding, on a basis of usage conditions of the one or more input source selectors and the plurality of decoding processors, whether or not the specified content can be reproduced with one of the plurality of decoding processors; instructions for designating, on a basis of the decision, which decoding processor and which output controller to use to reproduce the specified content; and instructions for using the designated decoding processor and the designated output controller to reproduce the specified content.

In one aspect of the machine-readable recording medium, when first content is already being reproduced by one of the plurality of decoding processors and a new reproduction instruction for second content is received, the instructions for deciding includes instructions for deciding whether or not the second content can be reproduced with another one of the decoding processors, differing from the decoding processor being used to reproduce the first content. When it is decided that the second content can be reproduced with the another one of the decoding processors, the instructions for designating includes instructions for designating the another one of the plurality of decoding processors as the decoding processor to use to reproduce the second content.

In another aspect of the machine-readable recording medium, when first content is already being reproduced by one of the plurality of decoding processors and a new reproduction instruction for second content is received, the instructions for deciding includes instructions for deciding whether or not the second content can be reproduced with another one of the decoding processors, differing from the decoding processor being used to reproduce the first content. When it is decided that the second content cannot be reproduced with the another one of the decoding processors, the instructions for deciding includes instructions for deciding whether or not the second content is identical to the first content.

BRIEF DESCRIPTION OF THE DRAWINGS

In the attached drawings.

FIG. 4 shows a resource management information table during a first case of content reproduction;

FIG. 5 shows a resource management information table during in a second case of content reproduction;

FIG. 6 shows a resource management information table during a third case of content reproduction;

FIG. 7 shows a resource management information table during a fifth case of content reproduction;

FIG. 10 shows an exemplary playlist displayed in the first embodiment;

FIG. 14 is a timing diagram showing exemplary transitions in reproduction channel status in the second embodiment.

DETAILED DESCRIPTION OF THE INVENTION

Figure 1:
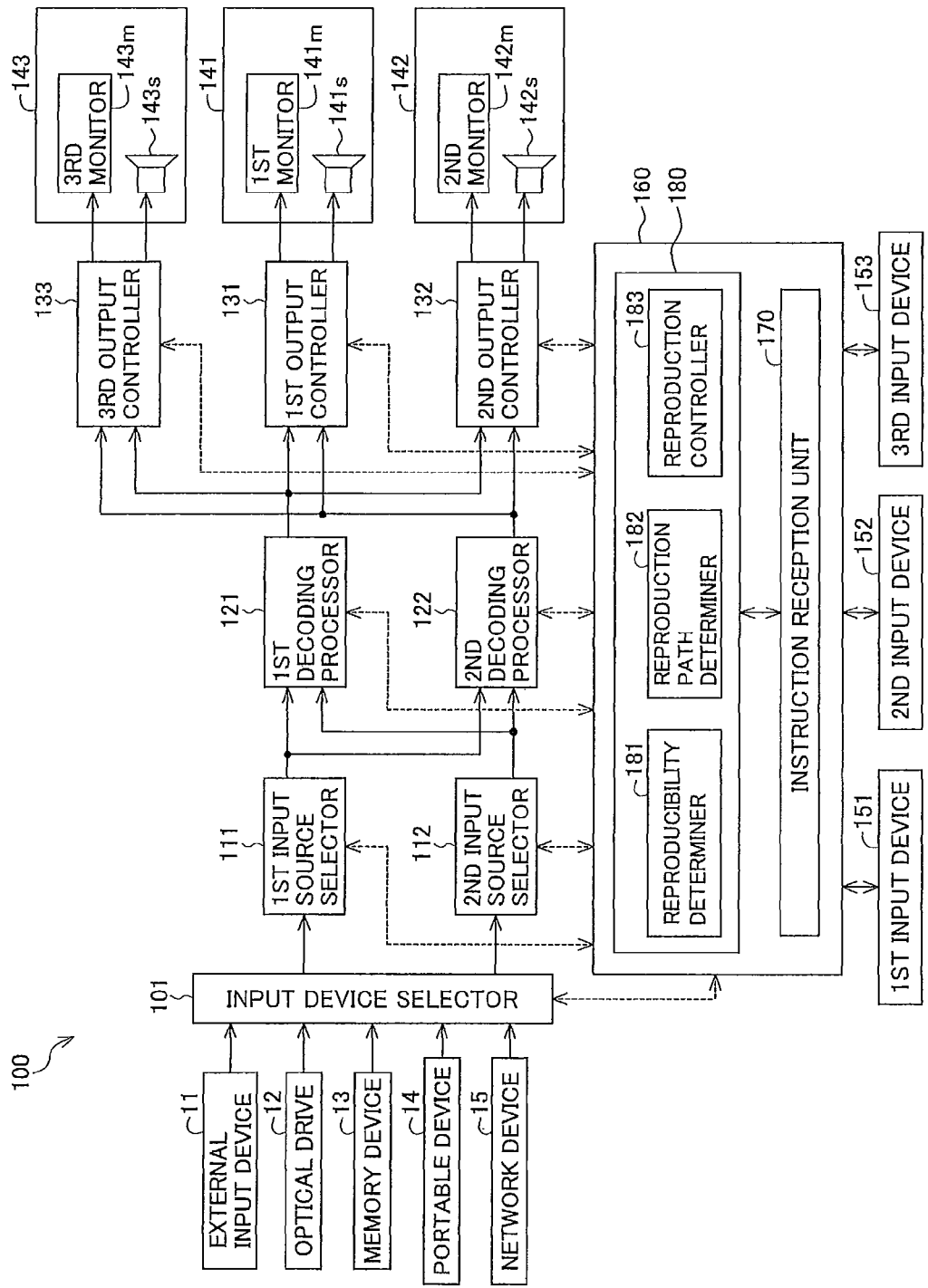
FIG. 1 is a block diagram illustrating the structure of a reproducing device in a first embodiment of the invention.

Embodiments of the invention will now be described with reference to the attached drawings, in which like elements are indicated by like reference characters.

First Embodiment

The reproducing device 100 in the first embodiment, shown in FIG. 1, is an audio-video device for reproducing content supplied as data from one or more input sources (also referred to simply as sources). The reproduced content may be audio-video content including at least one of audio content and video content. Video content may be either moving picture content or still picture content.

The input sources shown in FIG. 1 include an external input device 11, an optical drive 12, a memory device 13, a portable AV device 14, and a network device 15.

The external input device 11 outputs an analog audio-video signal such as a composite video signal, or a digital audio-video signal such as a high-definition multimedia interface (HDMI) signal or a digital visual interface (DVI) signal. The external input device 11 may be a device, such as a BD player or a video deck, with an audio-video output terminal that is connected to a composite video input terminal or HDMI input terminal on the reproducing device 100.

The optical drive 12 is a device for reading an optical disc such as a CD, DVD, or BD. In this embodiment, the optical drive 12 is built into the reproducing device 100. Optical discs on which moving picture files, music files, still picture files, and other such content are recorded can be inserted into the optical drive 12. Music and other audio content may be recorded in, for example, the Compact Disc Digital Audio (CD-DA) format. Moving pictures may be recorded in the DVD-Video or BD-Video format. On request, the optical drive 12 reads data from the inserted optical disc to output media information of the optical disc and the audio-video data.

The memory device 13 is a nonvolatile memory device such as an SD card, a USB memory, or a hard disk drive. Moving picture files, music files, still picture files, and other such content can be recorded in the memory device 13 in much the same way as they are recorded on an optical disc. On request, the memory device 13 outputs the recorded audio-video data to the reproducing device 100.

The portable AV device 14 is, for example, a portable audio player, a portable AV media player, or a portable telephone with advanced features. Broadly speaking, there are three types of portable AV devices, each type having a different form of output. The first type is recognized as a memory device and operates like a memory device. The second type has a USB connection to the reproducing device 100 and operates under control of the reproducing device 100, but decodes its own content and outputs an audio-video signal similar to the signal output by the external input device 11 to the reproducing device 100. The third type also has a USB connection to the reproducing device 100 and operates under control of the reproducing device 100, but outputs a streaming data to the reproducing device 100.

The network device 15 is a device for accessing a network (not shown) such as the Internet or a data communication network managed by wireless telephone company. In reproducing network content, the network device 15 may operate in a streaming mode by reproducing the content continuously while the content is being received, or in a download mode by first saving the content data into a nonvolatile memory such as the memory device 13 and then reproducing the content from the nonvolatile memory.

The audio-video signals mentioned above may be audio signals, video signals, or a combination of audio and video signals. The audio-video data mentioned above may include only audio data, only image data such as video data or still picture data, or both audio and image data.

The reproducing device 100 includes an input device selector 101, a first input source selector 111, a second input source selector 112, a first decoding processor 121, a second decoding processor 122, a first output controller 131, a second output controller 132, a third output controller 133, a first output unit 141, a second output unit 142, a third output unit 143, a first input device 151, a second input device 152, a third input device 153, and a control section 160.

The input device selector 101 has interfaces for connecting with the input sources (in this embodiment, the above input devices 11-15). The input device selector 101 detects the connected input sources and informs the control section 160 of the detection result. For example, the input device selector 101 determines whether or not it is receiving an audio-video signal from the external input device 11, and sends the control section 160 information indicating the presence or absence of an externally input audio-video signal. When an optical disc is inserted in the optical drive 12, the input device selector 101 acquires the media information of the optical disc from the optical drive 12 and sends the media information to the control section 160. When the optical disc is removed from the optical drive 12, the input device selector 101 informs the control section 160 that the optical disc has been removed. The input device selector 101 also detects the insertion and removal of a memory device 13 and sends corresponding memory device status information to the control section 160. When a portable AV device 14 is connected, the input device selector 101 determines which of the above three forms of output the device provides and sends AV device information indicating the form of output to the control section 160. When no portable AV device 14 is connected, the input device selector 101 sends the control section 160 AV device information indicating the disconnected state. The input device selector 101 also monitors network communication status, determines whether a network is available for use or whether the network device 15 itself is available for use, and sends the control section 160 corresponding availability information. The above information may be used by the control section 160 in its control operations, or displayed on the output units.

When content recorded in an input source is reproduced, the input device selector 101 obtains the content from the input source and sends it to the appropriate input source selector. For example, to reproduce content recorded in an optical disc inserted in the optical drive 12, the input device selector 101 sends a read request to the optical drive 12, reads the audio-video data of the content from the optical drive 12, and outputs the data to the input source selector. To also reproduce content recorded in a memory device 13, the input device selector 101 sends the memory device 13 a read request, reads the audio-video data of the content from the memory device 13 and outputs the data to the input source selector.

From among the plural content supplied from the input sources, the first and second input source selectors select and acquires the content to reproduce. For example, on command from the reproduction controller 183 (described later), the first input source selector 111 selects content to be reproduced, acquires the content from the corresponding input source through the input device selector 101 in the form of an audio-video signal, audio-video data, or streaming data, processes the content if necessary, and outputs the content to a designated decoding processor. The first input source selector has a demultiplexing function, when receiving audio-video data or streaming data from the input device selector 101, demultiplexes the received data into a video data stream, an audio data stream, and an auxiliary data stream for caption data or the like, and outputs the obtained data streams to the decoding processor. When the content is received in the form of an audio-video signal from the input device selector 101, no processing is necessary; the first input source selector 111 simply passes the audio-video signal onward to the designated decoding processor. The second input source selector 112 operates similarly.

The decoding processors perform decoding processes on content selected by the input source selectors. For example, the first decoding processor 121 may decode data stream such as video data stream or audio data stream output from the first input source selector 111 or second input source selector 112 to obtain an audio signal and a video signal, and send the decoded audio and video signals in mutual synchronization to one or more of the output controllers 131, 132, 133. The first decoding processor 121 includes, for example, a video decoding section for decoding a video data stream, an audio decoding section for decoding an audio data stream, and a caption decoding section for decoding an auxiliary data stream including, for example, caption or subtitle data. When the first decoding processor 121 receives an audio-video signal from the input source selector, decoding is unnecessary, so the first decoding processor 121 simply passes the received audio-video signal onward to one or more of the output controllers. The second decoding processor 122 operates similarly.

The output controllers 131, 132, 133 output audio-video signals received from the decoding processors 121, 122 to the output units to reproduce the content, adding further content as necessary. For example, the first output controller 131 may add the video signal of a graphics screen such as a graphic user interface (GUI) generated by the control section 160 to the video signal received from one of the decoding processors, and send the combined signal to the first monitor 141m of the first output unit 141 for reproduction thereby. The first output unit 141 also sends the audio signal received from the decoding processor to the first speaker 141s in the first output unit 141 for reproduction therethrough. The second and third output controllers 132, 133 operate similarly, sending respective video signals to the second and third monitors 142m, 143m and respective audio signals to the second and third speakers 142s, 143s in the second and third output units 142, 143.

The output units 141, 142, 143 output content received from the output controllers by displaying the received video signals on their monitors 141m, 142m, 143m and reproducing the audio signals through their speakers 141s, 142s, 143s. In an automobile cabin environment, for example, the first monitor 141m and first speaker 141s may be a right back seat monitor and a pair of headphones, the second monitor 142m and second speaker 142s may be a left back seat monitor and another pair of headphones, and the third monitor 143m and third speaker 143s may be the monitor of an automotive navigation system and a dashboard speaker placed in the front part of the cabin.

The input devices 151, 152, 153 are user interfaces such as remote controls or touch panels for receiving input from respective users. The first input device 151 receives instructions pertaining to reproduction by the first output unit 141, the second input device 152 receives instructions pertaining to reproduction by the second output unit 142, and the third input device 153 receives instructions pertaining to reproduction by the third output unit 143. In an automobile cabin environment, for example, the first input device 151, second input device 152, and third input device 153 may be used in the right back seat, the left back seat, and the front seat, respectively.

The set of functional blocks used for reproduction of content by a particular output unit will be referred to as a reproduction channel. In FIG. 1, the set of functional blocks involved in output of content by the first output unit 141 will be referred to as the first reproduction channel, the set of functional blocks involved in output of content by the second output unit 142 will be referred to as the second reproduction channel, and the set of functional blocks involved in output of content by the third output unit 143 will be referred to as the third reproduction channel. The first, second, and third input devices 151, 152, 153 receive instructions for reproduction on the first, second, and third reproduction channels, respectively.

The control section 160 controls the various units of the reproducing device 100, thereby controlling the operation of the reproducing device 100. The control section 160 may include a central processing unit (CPU). The control section 160 has an instruction reception unit 170 and a control unit 180.

The instruction reception unit 170 receives instructions pertaining to reproduction of content by an output unit. The instruction specifies the content and the output unit. In the present embodiment, the instruction reception unit 170 receives instructions pertaining to output of content by the first output unit 141 from the first input device 151, instructions pertaining to output of content by the second output unit 142 from the second input device 152, and instructions pertaining to output of content by the third output unit 143 from the third input device 153. Instructions pertaining to output of content include, for example, instructions to start reproduction, stop reproduction, and execute various types of special reproduction, such as fast-forward, rewind, pause, frame advance, and frame reverse.

The control unit 180 uses the input source selectors, decoding processors, and output controllers to provide content to the output units as requested by the instructions received by the instruction reception unit 170. The control unit 180 manages each reproduction channel. For each reproduction channel, the control unit 180 issues commands to the input source selector, decoding processor, and output controller used by the reproduction channel to start and stop the reproduction of content and execute special types of reproduction such as fast-forward and rewind, and performs processes necessary for resuming stopped reproduction.

Specifically, when the instruction reception unit 170 receives an instruction for reproduction of content, the control unit 180 checks the usage status of the input source selectors and decoding processors, and decides whether it is possible to reproduce the content using a decoding processor that is not being used by another reproduction channel. This type of reproduction will be referred to as solo output or solo reproduction, and may be referred to as separate reproduction or asynchronous reproduction. If solo reproduction is possible, the control unit 180 uses one of the available decoding processors to perform the solo reproduction of the content. If solo reproduction is not possible, the control unit 180 decides whether the requested content is already being reproduced on another reproduction channel, and if so, reproduces the content by using the same decoding processor as used in the other reproduction channel or the decoded content in the other reproduction channel. This type of reproduction will be referred to as shared output or shared reproduction, because two output units share the same content and the same decoding processor, and may be referred to as synchronous reproduction.

When the instruction reception unit 170 receives an instruction to stop reproduction or to perform special reproduction, the control unit 180 controls the decoding processor and output controller of the relevant reproduction channel to stop reproduction or execute special reproduction.

The control unit 180 in FIG. 1 includes a reproducibility determiner 181, a reproduction path determiner 182, and a reproduction controller 183.

When the instruction reception unit 170 receives a reproduction instruction, the reproducibility determiner 181 decides, on the basis of the usage status of the input source selectors and decoding processors, whether the requested content can be reproduced with one of the decoding processors. Specifically, if the instruction reception unit 170 receives an instruction for the reproduction of second content on one reproduction channel while one of the decoding processors is already being used to reproduce first content on another reproduction channel, the reproducibility determiner 181 decides whether the second content can be reproduced by use of a decoding processor other than the decoding processor being used in the first reproduction channel, and passes the result of this decision to the reproduction path determiner 182. If the reproducibility determiner 181 decides that the second content cannot be reproduced in this way, it then decides whether the second content is identical to the first content, and passes the result of this decision to the reproduction path determiner 182.

The reproducibility determiner 181 monitors the status of both the decoding processors and the input source selectors. When a user requests reproduction of content, the reproducibility determiner 181 checks whether there is an input source selector available for solo reproduction of the content, e.g., an input source selector currently not being used for reproduction, whether there is a decoding processor available for solo reproduction of the content, e.g., a decoding processor currently not being used for reproduction, and whether the input source of the content is available for solo reproduction of the content. If these conditions are satisfied, the reproducibility determiner 181 determines that the solo reproduction is possible and sends the reproduction path determiner 182 mode information indicating that the requested content can be reproduced in the solo mode. If not, then the reproducibility determiner 181 determines that the solo reproduction is not possible and checks whether the requested content is currently being reproduced on another reproduction channel. If this is so, the reproducibility determiner 181 determines that the shared reproduction of the content is possible and sends the reproduction path determiner 182 mode information indicating that the requested content can be reproduced in the shared mode. If not, the reproducibility determiner 181 determines that the shared reproduction of the content is not possible.

On the basis of the information received from the reproducibility determiner 181, the reproduction path determiner 182 determines the reproduction path (signal path) to be used to reproduce the requested content (the content specified in the reproduction instruction), thereby determining which decoding processor and which output controller to use for reproduction of the requested content. When the reproducibility determiner 181 indicates that solo reproduction is possible, the reproduction path determiner 182 designates one of the decoding processors that is available for solo reproduction as the decoding processor to be used to reproduce the requested content (the second content, if first content is already being reproduced). When the reproducibility determiner 181 indicates that the requested content (second content) is identical to first content already being reproduced, the reproduction path determiner 182 designates the decoding processor being used to reproduce the first content as the decoding processor to be used to reproduce the requested content. In either case, the reproduction path determiner 182 designates the output controller that controls the output unit to which the reproduction instruction pertains as the output controller to be used to reproduce the requested content.

For example, when the reproduction path determiner 182 receives solo mode information from the reproducibility determiner 181, it designates a reproduction path including an input source selector and a decoding processor that are available for solo reproduction. When the reproduction path determiner 182 receives shared mode information from the reproducibility determiner 181, it designates a reproduction path including an input source selector and a decoding processor that are already being used to reproduce the requested content on another reproduction channel.

The reproduction controller 183 controls the input source selectors, decoding processors, and output control units to control reproduction of content, according to the instructions (or user operation events) received by the instruction reception unit 170. When the instruction reception unit 170 receives an instruction to reproduce content, the reproduction controller 183 uses the decoding processor and output control unit designated by the reproduction path determiner 182 so as to have the content reproduced by the output unit to which the reproduction instruction applies. For example, the reproduction controller 183 controls the input source selector, decoding processor, and output controller including in the reproduction path designated by the reproduction path determiner 182 so as to reproduce the content by the output unit pertaining to the instruction, in either the solo or shared mode.

In the solo mode, when the instruction reception unit 170 receives an instruction to stop reproduction by a particular output unit, the reproduction controller 183 halts the operation of the input source selector and decoding processor on the relevant reproduction path, and when the instruction reception unit 170 receives an instruction for special reproduction by a particular output unit, the reproduction controller 183 controls the operation of the input source selector and decoding processor on the relevant reproduction path so that special reproduction is carried out.

The reproduction controller 183 also has a resume function. When the reproducing device 100 is powered off, the reproduction controller 183 saves resume information indicating the content being reproduced by each output unit and the current point of reproduction in the content. When the reproducing device 100 is powered on again, this resume information is used to resume reproduction of the content from the same point. In an automotive cabin environment, for example, the reproducing device 100 may be powered off when the automobile's engine is stopped and powered on when the engine is started. After reproduction stops because the engine stops, when the engine is started and the reproducing device 100 begins to receive power again, the reproduction controller 183 resumes reproduction of content from the point at which reproduction of the content stopped.

Another use of the resume function will be described in the second embodiment.

From the above description it can be seen that the reproducing device 100 provides a solo reproduction mode and a shared reproduction mode. When a user requests reproduction of content on an output unit, the usage status of the input source selectors and decoding processors is checked to determine whether solo reproduction or shared reproduction is possible, a reproduction path from an input source selector to the output unit is selected, and solo or shared reproduction is carried out on the selected path.

Figure 2:
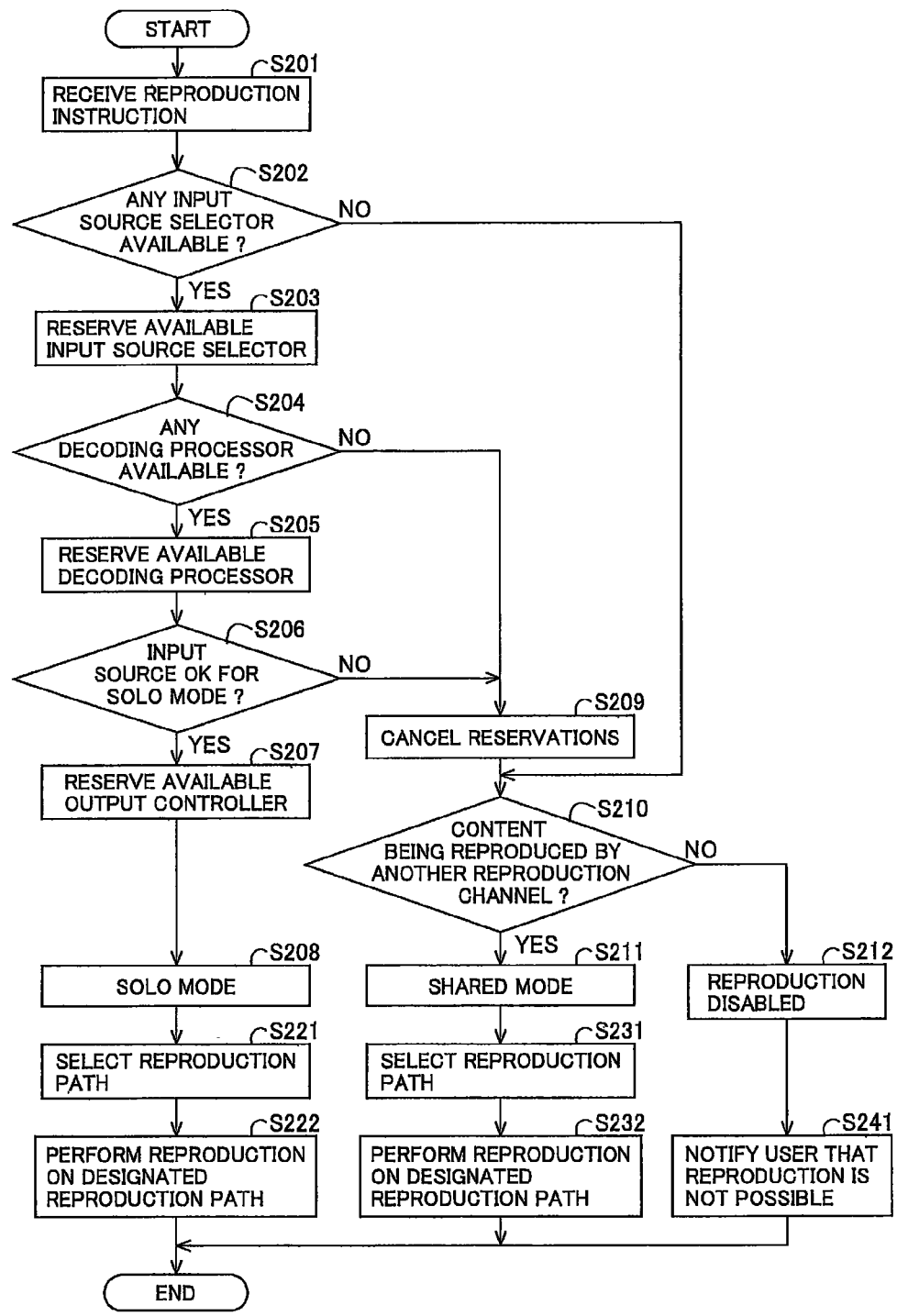
FIG. 2 is a flowchart illustrating an operating procedure followed by the control device in the first embodiment at the start of reproduction.

The procedure followed by the control section 160 in starting the reproduction of requested content will now be described with reference to the flowchart in FIG. 2.

When the instruction reception unit 170 receives an instruction to reproduce content from one of the input units 151, 152, 153 (step S201), it sends the reproduction controller 183 reproduction request information including input unit information identifying the input unit from which the instruction was received, input source information identifying the input source that is to supply the requested content, and content information (a file path, for example) identifying the content. When the reproduction controller 183 receives this reproduction request information from the instruction reception unit 170, it sends the information to the reproducibility determiner 181 to determine whether reproduction is possible in the solo mode or shared mode.

When the reproducibility determiner 181 receives reproduction request information from the reproduction controller 183, it checks the usage status of the input sources, input source selectors, decoding processors, and output controllers to decide whether solo reproduction is possible or shared reproduction is possible.

In particular, the reproducibility determiner 181 checks the usage status of all the input source selectors and decides whether one is available for use (step S202), where 'available for use' means 'not currently in use for reproduction' in this example. If no input source selector is available (No in step S202), solo reproduction is not possible and the procedure advances to step S210. If an input source selector is available (Yes in step S202), the reproducibility determiner 181 reserves an available input source selector (step S203).

After reserving an input source selector, the reproducibility determiner 181 checks the usage status of all the decoding processors and decides whether one is available for use (step S204), where 'available for use' again means 'not currently in use for reproduction' in this example. If no decoding processor is available (No in step S204), solo reproduction is not possible, the reservation made in step S203 is canceled (step S209), and the procedure advances to step S210. If a decoding processor is available (Yes in step S204), the reproducibility determiner 181 reserves an available decoding processor (step S205).

After reserving a decoding processor, the reproducibility determiner 181 decides whether the input source identified in the input source information is available for solo reproduction (step S206). If the input source is already being used on another reproduction channel and does not permit random access from multiple reproduction channels, the input source is not available for solo reproduction (No in step S206), the reservations made in steps S203 and S205 are canceled (step S209), and the procedure advances to step S210. If the input source is not currently being used by another reproduction channel, or if the input source permits random access from multiple reproduction channels, then the input source is available for solo reproduction (Yes in step S206), and the reproducibility determiner 181 reserves the output controller corresponding to the input unit designated in the input unit information (step S207), that is, the input unit from which the reproduction instruction was received.

An example of an input source that does not permit random access from multiple reproduction channels is the optical drive 12. The optical drive 12 reads data from an optical disc by moving an optical pickup. Random access to different areas on the optical disc would require much motion of the optical pickup to seek the different areas, which would greatly lower the rate at which data could be read from each area. The lowered read rate could cause the data input buffers in the decoding processors to underflow, and the seek noise could interfere with listening and viewing.

At the completion of step S207, the reproducibility determiner 181 has reserved an input source selector, a decoding processor, and an output controller, so it now selects the solo mode (step S208). The reproducibility determiner 181 sends the reproduction path determiner 182 mode information indicating that solo reproduction is possible, and the procedure advances to step S221.

In step S210, the reproducibility determiner 181 decides whether the content identified in the content information (the content to be reproduced) is currently being reproduced by another reproduction channel.

If the requested content is currently being reproduced (Yes in step S210), the reproducibility determiner 181 decides that shared reproduction is possible, selects the shared reproduction mode (step S211), and sends the reproduction path determiner 182 mode information indicating that shared reproduction is possible. The procedure then advances to step S231.

If the requested content is not currently being reproduced (No in step S210), the reproducibility determiner 181 decides that shared reproduction is not possible, selects the reproduction disabled mode (step S212), and sends the reproduction controller 183 information indicating that reproduction is not possible. The procedure then advances to step S241.

In step S221, the reproduction path determiner 182 selects the reproduction path. To manage the use of resources on the reproduction channels, the reproduction path determiner 182 maintains a resource management table such as the one in FIG. 4. Upon receiving mode information indicating that solo reproduction is possible, the reproduction path determiner 182 enters the input source selector reserved in step S203, the decoding processor reserved in step S205, and the output controller reserved in step S207 in the resource management table as resources to be used on the reproduction channel to which the reproduction instruction pertains. The reproduction path determiner 182 may receive information indicating the reserved input source selector, decoding processor, and output controller in the mode information received from the reproducibility determiner 181. By entering this information in the resource management table, the reproduction path determiner 182 designates the reproduction path. The reproduction path determiner 182 informs the reproduction controller 183 of the designated reproduction path, and the procedure advances to step S222.

In step S222 the reproduction controller 183 uses the input source selector, decoding processor, and output controller on the reproduction path designated in step S221 to reproduce the requested content in the solo mode. When notified by the reproduction path determiner 182 that the reproduction path has been determined, the reproduction controller 183 sends the reproduction path determiner 182 a request for resource management information concerning the reproduction channel on which reproduction has been requested, and makes settings in the resources on the basis of the information provided by the reproduction path determiner 182. Specifically, the reproduction controller 183 sets the decoding processor in the reproduction channel as the output destination of the input source selector in the reproduction channel, and sets the output controller in the reproduction channel as the output destination of the decoding processor in the reproduction channel. The reproduction controller 183 also sets the input source information and content information that were included in the reproduction request information in the input source selector in the reproduction channel. These settings cause the input source selector to obtain the requested content from the input source identified by the input source information via the input device selector 101, and output the content to the decoding processor. The decoding processor decodes the content received from the input source selector to obtain an audio-video signal, which it outputs to the output controller. The output controller adds a video signal obtained by conversion of graphic data generated by the control section 160, for example, to the video signal received from the decoding processor, outputs the combined video signal to the monitor in the output unit in the reproduction channel, and outputs the audio signal to the speaker in the output unit. The output controller may also add button clicks or other such sounds to the audio signal received from the decoding processor to provide the user with audio feedback in response to button pushes and other such operations.

In step S231 the reproduction path determiner 182, having been notified that reproduction in the shared mode is possible, selects the reproduction path. If the mode information received from the reproducibility determiner 181 includes information indicating the other reproduction channel on which the requested content is already being reproduced, the reproduction path determiner 182 enters the input source selector and decoding processor of this other reproduction channel in its resource management table as resources to be used on the reproduction channel on which reproduction is newly requested. The reproduction path determiner 182 also enters the output controller of the reproduction channel to which the reproduction instruction pertains in the resource management table. These entries designate the reproduction path. The reproduction path determiner 182 notifies the reproduction controller 183 of the designated reproduction path, and the procedure advances to step S232.

In step S232 the reproduction controller 183 uses the input source selector, decoding processor, and output controller on the reproduction path designated in step S231 to reproduce the requested content in the shared mode. When notified by the reproduction path determiner 182 that the reproduction path has been determined, the reproduction controller 183 sends the reproduction path determiner 182 a request for resource management information concerning the reproduction channel on which reproduction has been requested, and makes settings in the resources on the basis of the information provided by the reproduction path determiner 182. Specifically, the reproduction controller 183 sets the output controller in this reproduction channel as an additional output destination of the decoding processor in the reproduction channel. No other settings of the decoding processor or input source selector are necessary, since they are already reproducing the requested content. As in step S222, the output controller adds a video signal obtained by conversion of graphic data generated by the control section 160, for example, to the video signal received from the decoding processor, outputs the combined video signal to the monitor in the output unit, and outputs the audio signal to the speaker in the output unit. The output controller may also add sounds such as click sounds to the audio signal received from the decoding processor to provide the user with audible feedback in response to button pushes and other operations.

In step S241, the reproduction controller 183 notifies the user that reproduction of the requested content is not possible. The notification may take the form of a message or error tone that is output through the output controller to the output unit to which the reproduction request pertains. A message may be displayed in words or in graphics, as part of a graphic user interface.

Figure 3:
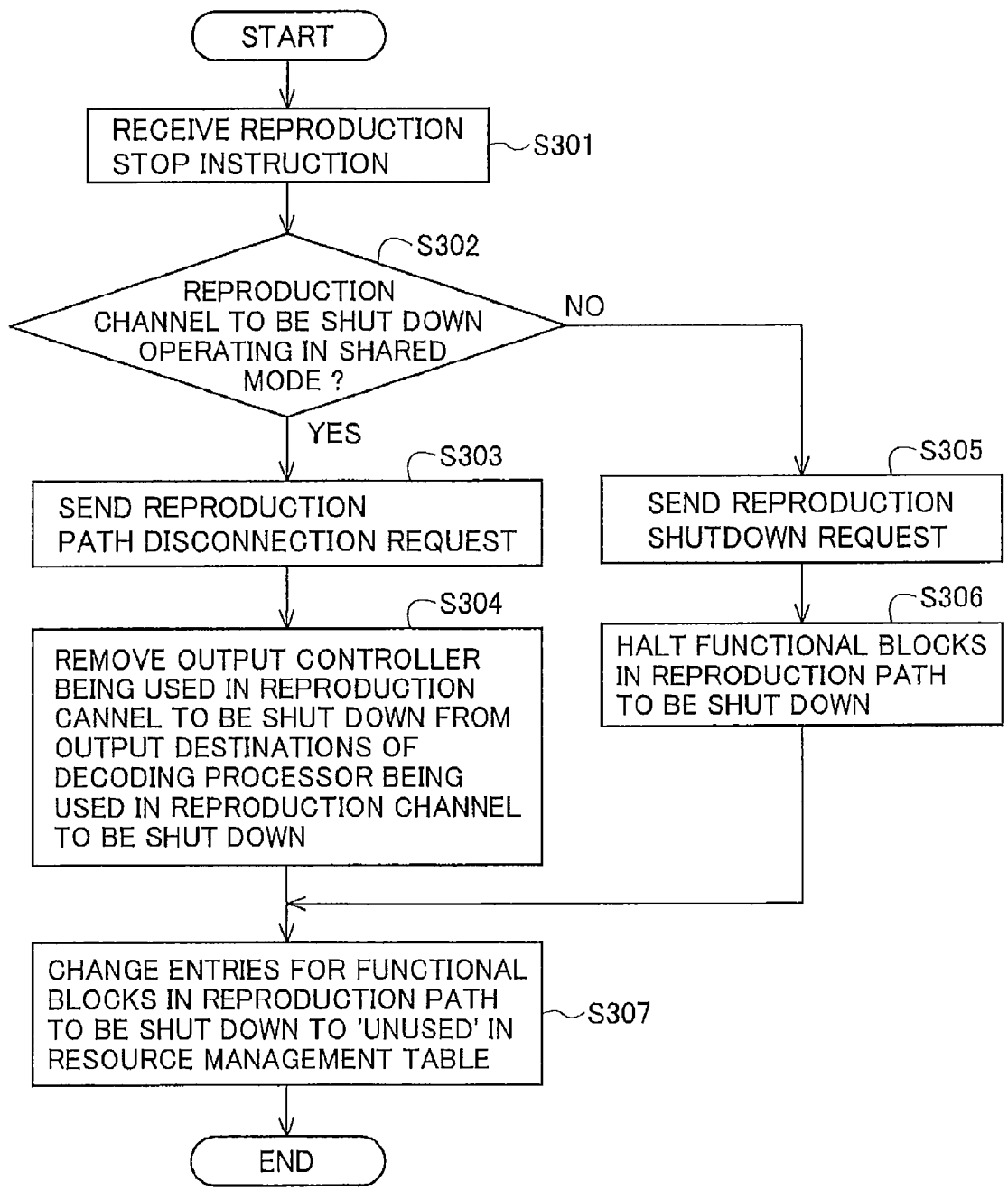
FIG. 3 is a flowchart illustrating an operating procedure followed by the control device in the first embodiment when reproduction is halted.

The procedure followed by the control section 160 in stopping reproduction will now be described with reference to the flowchart in FIG. 3.

When the instruction reception unit 170 receives an instruction to stop reproduction from one of the input units 151, 152, 153 (step S301), it sends the reproduction controller 183 reproduction shutdown request information including input unit information identifying the input unit from which the instruction was received. When the reproduction controller 183 receives the reproduction shutdown request information, it sends the reproduction shutdown request information to the reproducibility determiner 181.

When the reproducibility determiner 181 receives reproduction shutdown request information from the reproduction controller 183, it determines whether the input source selector and decoding processor in the reproduction channel corresponding to the input unit indicated by the input unit information (the reproduction channel to be shut down) are being used on another reproduction channel, that is, whether the reproduction channel to be shut down is operating in the shared mode (step S302).

If the reproduction channel is operating in the shared mode (Yes in step S302), the reproducibility determiner 181 sends a reproduction path disconnection request to the reproduction path determiner 182 (step S303). The reproduction path disconnection request is a request to remove the output controller used in the reproduction channel to be shut down from the set of output destinations of the decoding processor used in the reproduction channel to be shut down, that is, to delete the path from the decoding processor to the output controller.

When the reproduction path determiner 182 receives a reproduction path disconnection request from the reproducibility determiner 181, it sends a similar reproduction path disconnection request to the reproduction controller 183, requesting that the output controller in the reproduction channel to be shut down be removed from the set of output destinations of the decoding processor being used in the reproduction channel to be shut down.

When the reproduction controller 183 receives this reproduction path disconnection request, it removes the output controller in the reproduction channel to be shut down from the set of output destinations of the decoding processor being used in the reproduction channel to be shut down (step S304). The reproduction controller 183 then sends the reproduction path determiner 182 a reproduction path disconnection notification, and advances to step S307.

If the reproduction channel is not operating in the shared mode (No in step S302), the reproducibility determiner 181 sends the reproduction path determiner 182 a reproduction shutdown request (step S305). This reproduction shutdown request is a request to halt the input source selector and decoding processor used in the reproduction channel to be shut down and alter the resource management information of the reproduction channel to be shut down to indicate that the channel is not being used.

When the reproduction path determiner 182 receives a reproduction shutdown request from the reproducibility determiner 181, it sends the reproduction controller 183 a similar reproduction shutdown request.

When the reproduction controller 183 receives this reproduction shutdown request, it halts the input source selector and decoding processor being used in the reproduction channel to be shut down (step S306). The reproduction controller 183 may carry out this halting process by clearing the output settings of the input source selector and decoding processor. After performing the halting process, the reproduction controller 183 sends the reproduction path determiner 182 a reproduction shutdown notification and the procedure advances to step S307.

In step S307, after receiving the reproduction path disconnection notification or reproduction shutdown notification, the reproduction path determiner 182 updates the resource management table to indicate that the input source selector, decoding processor, and the output controller in the shutdown reproduction channel are not being used.

The operation of the reproducing device 100 in five specific cases will now be described. The five cases are assumed to occur in succession.

Case One

In this case, in the state in which none of the reproduction channels are being used, the user of the first output unit 141 (referred to below as the first user) requests reproduction of content C1 on the first reproduction channel. Content C1 is a moving picture file stored in the memory device 13.

The first user selects content C1 from a list of content stored in the memory device 13, which is displayed on the first monitor 141*m*. The first user uses the first input device 151 to give the reproducing device 100 an instruction to reproduce content C1.

When the instruction reception unit 170 in the reproducing device 100 receives the first user's instruction from the first input device 151, it sends the reproduction controller 183 reproduction request information including input unit information identifying the first input device 151, input source information identifying the memory device 13, and content information identifying content C1.

The reproduction controller 183 receives this reproduction request information and passes it to the reproducibility determiner 181.

When the reproducibility determiner 181 receives the reproduction request information from the reproduction controller 183, it determines whether an input source selector is available for use. In the present case an input source selector is available for use, so the reproducibility determiner 181 reserves an available input source selector as the input source selector for the first reproduction channel. It will be assumed that the first input source selector 111 is reserved.

After reserving the input source selector, the reproducibility determiner 181 determines whether a decoding processor is available for use. In the present case a decoding processor is available for use, and the reproducibility determiner 181 reserves an available decoding processor as the decoding processor for the first reproduction channel. It will be assumed that the first decoding processor 121 is reserved.

After reserving the decoder, the reproducibility determiner 181 determines whether the input source designated by the input source information is available for solo reproduction. In the present case, the memory device 13 is not currently in use, so the reproducibility determiner 181 determines that the memory device 13 is available for solo reproduction and reserves the first output controller 131 as the output controller of the first reproduction channel.

After reserving the output controller, the reproducibility determiner 181 selects the solo mode and sends the reproduction path determiner 182 reproduction mode information indicating the solo mode.

On the basis of the reproduction mode information received from the reproducibility determiner 181, the reproduction path determiner 182 now sets a reproduction path including the reserved first input source selector 111, first decoding processor 121, and first output controller 131 as the reproduction path of the first reproduction channel, and enters the first input source selector 111, first decoding processor 121, and first output controller 131 as resources of the first reproduction channel in the resource management table. FIG. 4 shows the resource management table 400 after this information has been entered. The resource management information 401 recorded for the first reproduction channel indicates that the input source selector, decoding processor, and output controller of the first reproduction channel are the first input source selector, the first decoding processor, and the first output controller. The reproduction path determiner 182 now notifies the reproduction controller 183 that the reproduction path has been determined.

Upon receiving this notification from the reproduction path determiner 182, the reproduction controller 183 requests the resource management information for the first reproduction channel from the reproduction path determiner 182. On the basis of the received resource management information, the reproduction controller 183 sets the first decoding processor 121 as an output destination of the first input source selector 111 and sets the first output controller 131 as an output destination of the first decoding processor 121. Next, the reproduction controller 183 sends the first input source selector 111 the input source information and content information included in the reproduction request information.

On the basis of the received input source information and content information, the first input source selector 111 sends a request for the audio-video data of content C1 to the memory device 13 through the input device selector 101, reads the audio-video data of content C1 through the input device selector 101, demultiplexes the read data into a plurality of data streams such as an audio data stream, a video data stream, and a caption data stream, and sends these data streams to the first decoding processor 121. The first decoding processor 121 decodes the data streams, and sends the resulting audio and video signals to the first output controller 131.

The first output controller 131 combines the video signal received from the first decoding processor 121 with a video signal received from the reproduction controller 183 as described above and outputs the combined video signal to the first monitor 141m. The audio signal received from the first decoding processor 121 is output to the first speaker 141s. To provide audible feedback for user operations, the first output controller 131 may also add clicks or other sounds to the audio signal, as described above.

Case Two

Following Case One, the user of the second output unit 142 (referred to below as the second user) requests reproduction of content C2 on the second reproduction channel. Content C2 is a moving picture file stored in the optical drive 12.

The second user selects content C2 from a list of content stored in the optical drive 12, which is displayed on the second monitor 142m. The second user uses the second input device 152 to give the reproducing device 100 an instruction to reproduce content C2.

When the instruction reception unit 170 in the reproducing device 100 receives the second user's instruction from the second input device 152, it sends the reproduction controller 183 reproduction request information including input unit information identifying the second input device 152, input source information identifying the optical drive 12, and content information identifying content C2.

The reproduction controller 183 receives this reproduction request information and passes it to the reproducibility determiner 181.

When the reproducibility determiner 181 receives the reproduction request information from the reproduction controller 183, it determines whether an input source selector is available for use. In the present case the second input source selector 112 is available for use. The reproducibility determiner 181 reserves the second input source selector 112 as the input source selector for the second reproduction channel.

After reserving the input source selector, the reproducibility determiner 181 determines whether a decoding processor is available for use. In the present case the second decoding processor 122 is available for use. The reproducibility determiner 181 reserves the second decoding processor 122 as the decoding processor for the second reproduction channel.

After reserving the decoder, the reproducibility determiner 181 determines whether the input source designated by the input source information is available for solo reproduction. In the present case, the optical drive 12 is currently not in use, so the reproducibility determiner 181 decides that the optical drive 12 is available for solo reproduction and reserves the second output controller 132 as the output controller of the second reproduction channel.

After reserving the output controller, the reproducibility determiner 181 selects the solo mode and sends the reproduction path determiner 182 reproduction mode information indicating the solo mode.

On the basis of the reproduction mode information received from the reproducibility determiner 181, the reproduction path determiner 182 now sets a reproduction path including the reserved second input source selector 112, second decoding processor 122, and second output controller 132 as the reproduction path of the second reproduction channel, and enters the second input source selector 112, second decoding processor 122, and second output controller 132 as resources of the second reproduction channel in the resource management table. FIG. 5 shows the resource management table 500 after this information has been entered. The resource management information 501 recorded for the second reproduction channel indicates that the input source selector, decoding processor, and output controller of the second reproduction channel are the second input source selector, the second decoding processor, and the second output controller. The reproduction path determiner 182 now notifies the reproduction controller 183 that the reproduction path has been determined.

Upon receiving this notification from the reproduction path determiner 182, the reproduction controller 183 requests the resource management information for the second reproduction channel from the reproduction path determiner 182. On the basis of the received resource management information, the reproduction controller 183 sets the second decoding processor 122 as an output destination of the second input source selector 112 and sets the second output controller 132 as an output destination of the second decoding processor 122. Next, the reproduction controller 183 sends the second input source selector 112 the input source information and content information included in the reproduction request information.

On the basis of the received input source information and content information, the second input source selector 112 sends a request for the audio-video data of content C2 to the optical drive 12 through the input device selector 101, reads the audio-video data of content C2 through the input device selector 101, demultiplexes the read data into a plurality of data streams such as an audio data stream, a video data stream, and a caption data stream, and sends these data streams to the second decoding processor 122. The second decoding processor 122 decodes the data streams, and sends the resulting audio and video signals to the second output controller 132.

The second output controller 132 combines the video signal received from the second decoding processor 122 with a video signal received from the reproduction controller 183 as described above and outputs the combined video signal to the second monitor 142m. The audio signal received from the second decoding processor 122 is output to the second speaker 142s, possibly with clicks or other sounds added to provide audible feedback for operations performed by the second user.

Case Three

Following Case Two, the user of the third output unit 143 (referred to below as the third user) requests reproduction of content C2 on the third reproduction channel. Content C2 is the moving picture file, stored in the optical drive 12, that the second user is viewing.

The third user selects content C2 from a list of content stored in the optical drive 12, which is displayed on the third monitor 143m. The third user uses the third input device 153 to give the reproducing device 100 an instruction to reproduce content C2.

When the instruction reception unit 170 in the reproducing device 100 receives the third user's instruction from the third input device 153, it sends the reproduction controller 183 reproduction request information including input unit information identifying the third input device 153, input source information identifying the optical drive 12, and content information identifying content C2.

The reproduction controller 183 receives this reproduction request information and passes it to the reproducibility determiner 181.

When the reproducibility determiner 181 receives the reproduction request information from the reproduction controller 183, it determines whether an input source selector is available for use. No input source selector is available in the present case, so the reproducibility determiner 181 decides that solo reproduction is not possible. Next, the reproducibility determiner 181 decides whether the requested content C2 is already being reproduced on another channel. Since the requested content C2 is indeed being reproduced on another channel, the reproducibility determiner 181 decides that shared reproduction is possible, selects the shared mode, and sends mode information indicating the shared mode to the reproduction path determiner 182.

On the basis of the reproduction mode information received from the reproducibility determiner 181, the reproduction path determiner 182 refers to the resource management table and sets a reproduction path including the second input source selector 112 and second decoding processor 122, which are currently being used to reproduce content C2 on the second channel, and third output controller 133 as the reproduction path of the third reproduction channel, and enters the second input source selector 112, second decoding processor 122, and third output controller 133 as resources of the third reproduction channel in the resource management table. FIG. 6 shows the resource management table 600 after this information has been entered. The resource management information 601 recorded for the third reproduction channel indicates that the input source selector, decoding processor, and output controller of the third reproduction channel are the second input source selector, the second decoding processor, and the third output controller. The reproduction path determiner 182 now notifies the reproduction controller 183 that the reproduction path has been determined.

Upon receiving this notification from the reproduction path determiner 182, the reproduction controller 183 requests the resource management information for the third reproduction channel from the reproduction path determiner 182. On the basis of the received resource management information, the reproduction controller 183 sets the third output controller 133 as an additional output destination of the second decoding processor 122.

This setting causes the second decoding processor 122 to output decoded audio and video signals to both the second output controller 132 and third output controller 133.

The third output controller 133 combines the video signal received from the second decoding processor 122 with a video signal received from the reproduction controller 183 as described above and outputs the combined video signal to the third monitor 143m. The audio signal received from the second decoding processor 122 is output to the third speaker 143s, possibly with clicks or other sounds added to provide audible feedback for operations performed by the third user.

When shared reproduction starts on the third reproduction channel, the second and third reproduction channels share the second input source selector 112 and second decoding processor 122, and reproduce and output the same audio and video signals, so the second channel also shifts from the solo mode to the shared mode.

Case Four

Following Case Three, the second user makes a new request to reproduce content C3 on the second reproduction channel. Content C3 is another moving picture file stored in the memory device 13, not currently being reproduced on any other channel.

The second user uses the second input device 152 to select content C3 from a list of files recorded in the memory device 13 and instruct the reproducing device 100 to reproduced content C3. The list of files is displayed on the second monitor 142*m*.

When the instruction reception unit 170 in the reproducing device 100 receives the second user's new instruction from the second input device 152, it sends corresponding reproduction request information to the reproduction controller 183, which passes the information to the reproducibility determiner 181.

When the reproducibility determiner 181 receives the reproduction request information, it determines whether an input source selector is available for use. No input source selector is available in the present case, so the reproducibility determiner 181 decides that solo reproduction is not possible. Next, the reproducibility determiner 181 decides whether the requested content C3 is already being reproduced on another reproduction channel. Since the requested content C3 is not being reproduced on another reproduction channel, the reproducibility determiner 181 decides that reproduction is not possible, selects the reproduction disabled mode, and notifies the reproduction controller 183 that reproduction is not possible. The reproduction controller 183 outputs a message or error tone indicating that reproduction is not possible to the second output unit 142 through the second output controller 132.

Case Five

Following Case Four, the second user gives an instruction to stop reproduction from the optical drive 12 on the second reproduction channel, which is currently operating in the shared mode, reproducing the same content as the third reproduction channel. Case Five is accordingly a case in which a request is made to stop reproduction on one of two reproduction channels that are operating in the shared mode.

The second user uses the second input device 152 to instruct the reproducing device 100 to stop reproducing content C2. This instruction applies to the second reproduction channel.

When the instruction reception unit 170 in the reproducing device 100 receives the second user's instruction from the second input device 152, it sends the reproduction controller 183 reproduction shutdown request information including input unit information identifying the second input device 152.

The reproduction controller 183 receives the reproduction shutdown request information and passes it to the reproducibility determiner 181.

When the reproducibility determiner 181 receives the reproduction shutdown request information from the reproduction controller 183, it determines whether the second input source selector 112 and second decoding processor 122 being used in the second reproduction channel are also being used on another reproduction channel, that is, whether the second reproduction channel is operating in the shared mode. In the present case the second reproduction channel is operating in the shared mode, so the reproducibility determiner 181 sends the reproduction path determiner 182 a reproduction path disconnection request.

When the reproduction path determiner 182 receives the reproduction path disconnection request, it sends a reproduction path disconnection request to the reproduction controller 183.

When the reproduction controller 183 receives the reproduction path disconnection request, it changes the settings of the second decoding processor 122 so that the only output destination of the second decoding processor 122 is the third output controller 133, instead of both the second output controller 132 and third output controller 133. The reproduction controller 183 then sends the reproduction path determiner 182 a reproduction path disconnection notification.

When the reproduction path determiner 182 receives the reproduction path disconnection notification, it changes the entries for the input source selector, decoding processor, and output controller of the second reproduction path to indicate that these facilities are not being used. FIG. 7 shows the resource management table 700 after this change. The updated resource management information 701 for the second reproduction channel indicates that no input source selector, decoding processor, or output controller resources are being used by the second reproduction channel.

This shutdown of the second reproduction channel causes the third reproduction channel to shift from the shared mode to the solo mode. In general, when a plurality of reproduction channels are sharing the same content, an instruction to stop reproduction on one reproduction channel halts reproduction only on that reproduction channel; reproduction can continue on the other reproduction channels. If there is only one other such reproduction channel, it shifts from the shared mode to the solo mode.

Figure 8:
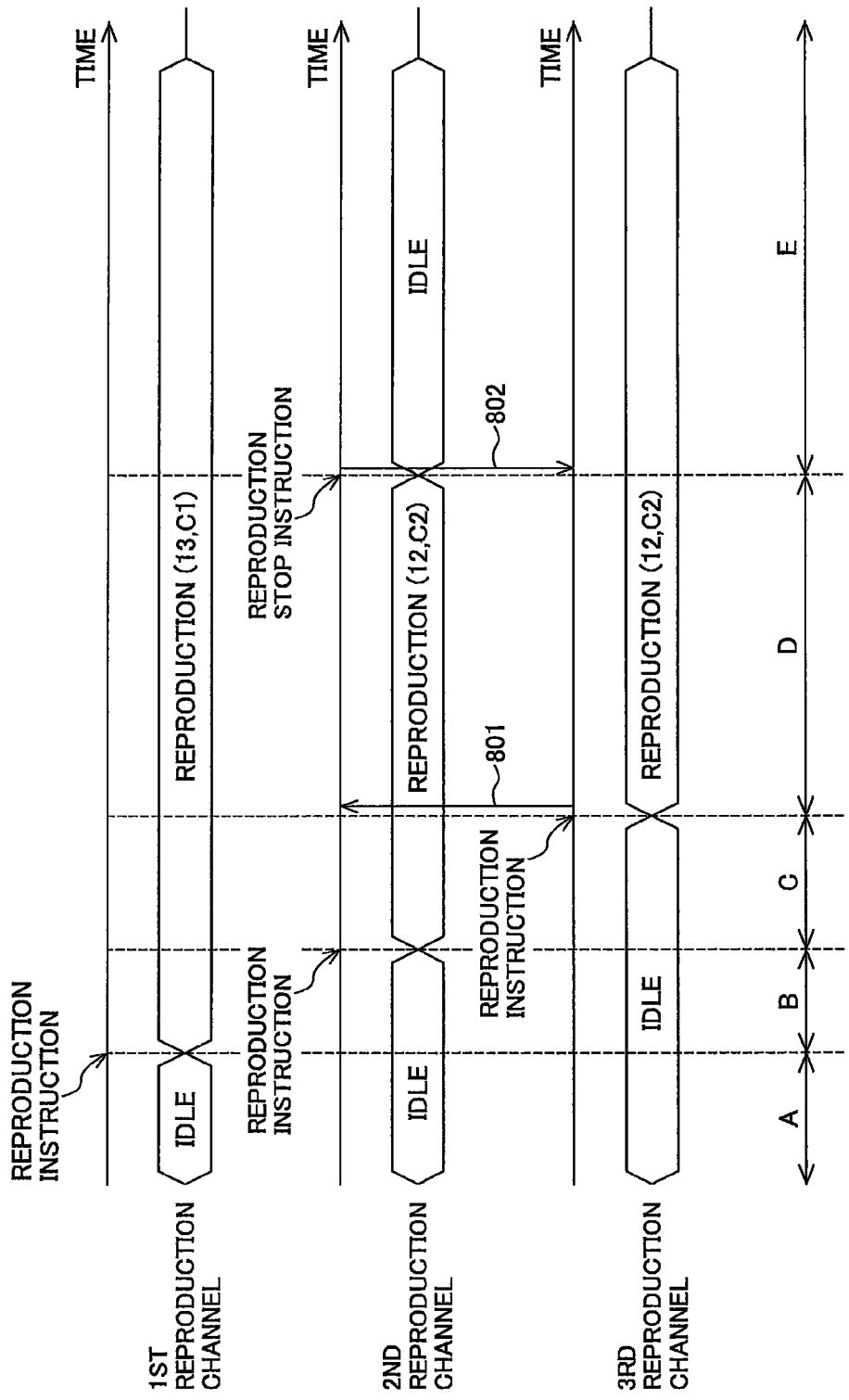
FIG. 8 is a timing diagram illustrating transitions in reproduction channel status during the above cases.

The five cases described above are illustrated in the timing diagram in FIG. 8. In the initial interval A, the first, second, and third reproduction channels are all idle. In the next interval B, the second and third reproduction channels remain idle while the first reproduction channel, operating in the solo mode, carries out normal reproduction of the content C1 requested by the first user from the memory device 13. During interval B, the resource management table 400 holds the information shown in FIG. 4. In the following interval C, the first reproduction channel continues normal reproduction of content C1 from the memory device 13 in the solo mode, the second reproduction channel carries out normal reproduction of content C2 requested by the second user from the optical drive 12 in the solo mode, the third reproduction channel remains idle, and the resource management table holds the information shown in FIG. 5. When, in the state in interval C, the third user issues a reproduction instruction to the reproducing device 100 to reproduce content C2 from the optical drive 12, the reproducing device 100 commences shared reproduction of content C2 on the third reproduction channel and sends a shared reproduction initiation notification 801 to the second reproduction channel, causing the second reproduction channel to shift to the shared mode. During the next interval D, accordingly, the first reproduction channel continues normal reproduction of content C1 from the memory device 13 in the solo mode, the second and third reproduction channels carry out normal reproduction of content C2 from the optical drive 12 in the shared mode, and the resource management table holds the information shown in FIG. 6. When, in the state in interval D, the second user instructs the reproducing device 100 to stop reproduction, the reproducing device 100 carries out reproduction shutdown processing in the second reproduction channel and then sends a shared reproduction termination notification 802 to the third reproduction channel, causing the third reproduction channel to shift to the solo mode. In the interval E following interval D, accordingly, the first reproduction channel continues normal reproduction of content C1 from the memory device 13 in the solo mode, the second reproduction channel is idle, the third reproduction channel carries out normal reproduction of content C2 from the optical drive 12 in the solo mode, and the resource management table holds the information shown in FIG. 7.

Figure 9:
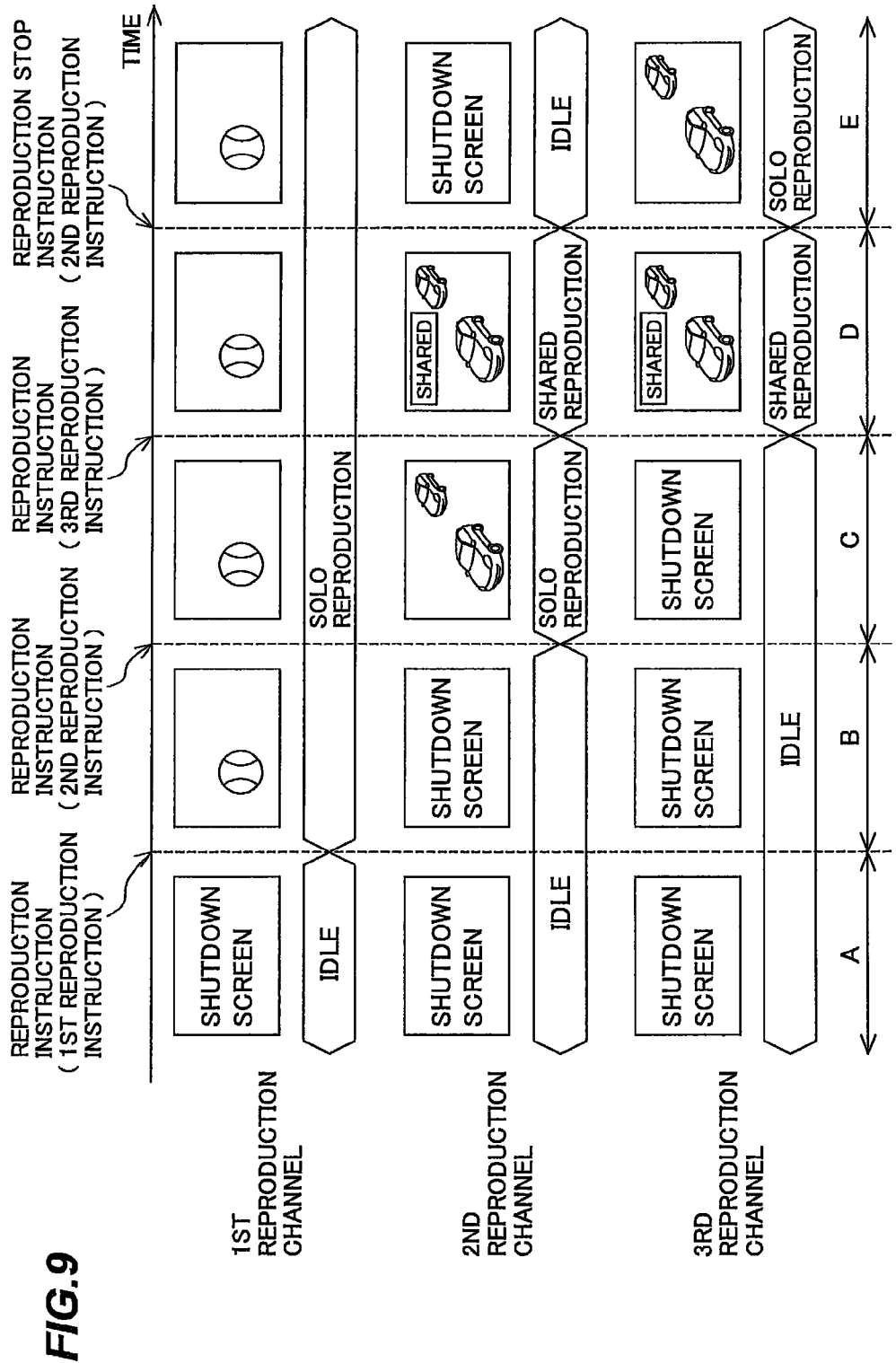
FIG. 9 is another diagram illustrating display output transitions during the above cases.

The pictures on the monitor screens of the three reproduction channels in the cases described above are shown in FIG. 9. Intervals A to E are the same as in FIG. 8. In interval A, the first, second, and third reproduction channels all display a shutdown screen. In interval B, content C1 is reproduced on the screen of the first reproduction channel, while the second and third reproduction channels continue to display the shutdown screen. In interval C, content C1 is reproduced on the screen of the first reproduction channel, content C2 is reproduced on the screen of the second reproduction channel, and the third reproduction channel continues to display the shutdown screen. In interval D, content C1 is reproduced on the screen of the first reproduction channel and content C2 is reproduced on the screens of the second and third reproduction channels, accompanied by messages 901, 902 indicating the shared mode. In interval E, content C1 is reproduced on the screen of the first reproduction channel, the shutdown screen is displayed on the second reproduction channel, and content C2 is reproduced on the screen of the third reproduction channel. The display of the messages 901, 902 is controlled by the control section 160. The control section 160 starts displaying message 902 when the third reproduction channel shifts to the shared mode, and stops displaying message 902 when the third reproduction channel shifts to the solo mode. The control section 160 also starts displaying message 901 when the second reproduction channel shifts to the shared mode, and stops displaying message 901 when reproduction on the second reproduction channel is shut down.

The following effects (1) to (6) are obtained from the first embodiment.

(1) In a reproducing device having a plurality of decoding processors for decoding content supplied from one or more input sources and a plurality of output controllers for reproduction and output of the decoded content, when an instruction for reproduction of content is received, whether solo reproduction of the content is possible is determined, and solo reproduction is carried out if possible. When solo reproduction is not possible, if the same content is currently being reproduced on another reproduction channel, shared reproduction is carried out. The present embodiment therefore enables content to be reproduced and output by all of the output controllers (or output units) even if the number of decoding processors or input sources is limited relative to the number of output controllers (or output units). If the number of decoding processors or the number of input sources is less than the total number of output controllers, for example, solo reproduction may sometimes not be possible, but shared reproduction is always possible. Situations in which an output controller is unable to reproduce any content at all are therefore avoided. In some situations a user's range of content selection may be limited, but every user can always obtain reproduction of some content.

The cost of the device can therefore be reduced, because it can be configured with a limited number of decoding processors or input sources relative to the number of output controllers: for example, with fewer decoding processors or input sources than the total number of output controllers.

(2) The reproducing device has one or more input source selectors that select content to be reproduced from among plural content supplied from one or more input sources, and a plurality of decoding processors for decoding the content selected by the input source selectors. The control section carries out solo reproduction by using an input source selector and decoding processor available for the solo reproduction when the solo reproduction is possible, and carries out shared reproduction by using the decoding processor of another reproduction channel when the content is currently being reproduced on the other reproduction channel. All output controllers can therefore reproduce content, even when the number of decoding processors, input source selectors, or input sources is limited in comparison with the number of output controllers.

In an audio-video reproducing device connected to a plurality of output units (for example, a plurality of paired monitors and speakers), providing the same number of input sources or decoding processors as the total number of output units may raise a cost problem. The present embodiment, however, can be configured with fewer input sources, input source selectors, or decoding processors than the total number of output units, permitting solo or shared reproduction with an inexpensive hardware configuration.

Furthermore, in a reproducing device connected to a plurality of output units (for example, a plurality of paired monitors and speakers), if the decoding processing is performed by the same number of decoding processors as the total number of output units, then when the same content is shared by a plurality of output units, the software for controlling the input source selectors, decoding processors, and output controllers individually becomes complex. For example, complex software is necessary to maintain video frame synchronization and audio frame synchronization between the different decoding processors, and considerable program storage area may be needed to store the software programs. In the present embodiment, when the same content is reproduced by a plurality of output units, the same decoding processor is used, so the need for complex software can be avoided.

(3) In deciding whether or not solo reproduction is possible, the control section decides that solo reproduction is not possible when the input source corresponding to the requested content is already in use and is not capable of supplying content to two or more output destinations simultaneously. This feature of the present embodiment can prevent adverse effects on another reproduction channel that is currently carrying out reproduction using the input source for which a new reproduction instruction is received. For example, it can prevent such problems as audible noise, glitches in the picture being watched by another user, or the sudden ending of reproduction on the other reproduction channel due to an error.

(4) When the control section performs shared reproduction of content on a particular output controller, it causes the output controller to output information indicating shared reproduction is performed. The user can accordingly tell that the content is being reproduced in shared mode. The control section also causes the output controller in the other reproduction channel in which the same content is being reproduced to output information indicating shared reproduction is taking place, so that the user of the other reproduction channel can also tell that the content is being reproduced in shared mode.

Specifically, when the same content is being reproduced on a plurality of channels using the same input source selector and decoding processor, in one aspect of the embodiment, if an instruction such as an instruction for special reproduction is made on one of the reproduction channels, the instruction is executed on all of the reproduction channels reproducing the shared content, causing the users on reproduction channels other than the reproduction channel on which the instruction was given to experience an unexpected and therefore confusing change in reproduction status. If a message indicating shared reproduction is displayed, however, the users of the other reproduction channels will understand that the change in reproduction status is due to an instruction given by another user, so confusion will be avoided.

(5) The control section manages the reproduction paths by maintaining a resource management table indicating the resources used by each reproduction channel. Accordingly, when the control section receives a reproduction instruction, it does not have to query all of the input source selectors, decoding processors, and output controllers to find out whether they are available for use; it can find available units quickly from the resource management table.

(6) Any output controller can be set as an output destination of any decoding processor, enabling reproduction paths to be switched dynamically, which is convenient for the user.

The reproducing device is not limited to the configuration shown in FIG. 1 and described above. Other possible configurations (a) to (j) are described below.

(a) The exemplary configuration described above had two input source selectors, two decoding processors, and three output controllers, but these numbers are not limiting; there may be more input source selectors, more decoding processors, or more output controllers.

(b) The input source selectors in the description above had identical functions, but the input source selectors may have differing functions (for example, differing demultiplexing functions). Similarly, the decoding processors may have differing decoding functions.

(c) In the description above, it was noted that each decoding processor may include a video decoding section, an audio decoding section, and a caption decoding section, but in an alternative configuration each such decoding section is managed as a separate decoding processor. The decoding processors of each type may then include decoding processors with different functions. For example, there may be a standard-definition (SD) video decoding processor and a high-definition (HD) video decoding processor. As audio decoding processors, a hardware codec may be provided to handle comparatively heavy processing loads and a software codec may be provided for comparatively light processing loads. More generally, the reproducing device 100 may include m types of video decoding processors for decoding m different types of video stream data and n types of audio decoding processors for decoding m different types of audio stream data, where m and n are arbitrary integers greater than one. When an instruction to reproduce content is received, if a video decoding processor and an audio decoding processor of the necessary type are available from among the m video decoding processors and n audio decoding processors, the reproducing device 100 uses them for solo reproduction of the content. When the necessary types of decoding processors are not available for solo reproduction, shared reproduction is carried out if the same content is already being reproduced on another reproduction channel; otherwise, reproduction is disabled.

(d) In determining whether or not solo reproduction is possible, the control unit 180 may decide whether or not there is an input source selector that can demultiplex the requested content and is not currently in use. For example, in step S202 in FIG. 2, the reproducibility determiner 181 may decide that an input source selector is available for solo reproduction if the input source selector can demultiplex the requested content and is not currently in use. More specifically, the reproducibility determiner 181 may first designate the input source selectors that are not currently in use as candidates for reservation, then decide whether at least one of these candidates has the necessary demultiplexing function, and if so, select and reserve one of the candidates that has the necessary demultiplexing function. If there is no candidate having the necessary demultiplexing function, the reproducibility determiner 181 decides that no input source selector is available for solo reproduction. To decide whether an input source selector has the necessary demultiplexing function, the reproducibility determiner 181 may use the content information that identifies the content to access the content file, obtain information identifying the multiplexing method of the content from header information or tag information of the content file, and compare this information with information stored in a nonvolatile memory indicating the demultiplexing capabilities of each input source selector.

This scheme enables demultiplexing errors to be avoided. In addition, when solo reproduction is not possible, this scheme enables the user to be informed more quickly, so that the user can obtain a faster response from the reproducing device 100.

This scheme can be applied when the input source selectors have different functions, for example, different demultiplexing functions.

(e) Similarly, in determining whether or not solo reproduction is possible, the control unit 180 may decide whether or not there is a decoding processor that can decode the requested content and is not currently in use. For example, in step S204 in FIG. 2, the reproducibility determiner 181 may decide that a decoding processor is available for solo reproduction if the decoding processor can decode the requested content and is not currently in use. More specifically, the reproducibility determiner 181 may first designate the decoding processors that are not currently in use as candidates for reservation, then decide whether at least one of these candidates has the necessary decoding function, and if so, select and reserve one of the candidates that has the necessary decoding function. If there is no candidate having the necessary decoding function, the reproducibility determiner 181 decides that no decoding processor is available for solo reproduction. To decide whether a decoding processor has the necessary decoding function, the reproducibility determiner 181 may use the content information that identifies the content to access the content file, obtain codec information from header information or tag information of the content file, and compare this codec information with information stored in a nonvolatile memory indicating the decoding capabilities of each decoding processor.

This scheme enables decoding errors to be avoided. In addition, when solo reproduction is not possible, this scheme enables the user to be informed more quickly, so that the user can obtain a faster response from the reproducing device 100.

This scheme can be applied when the decoding processors have different functions, for example, different decoding functions.

(f) In determining whether or not solo reproduction is possible, the control unit 180 may determine whether solo reproduction can be executed without exceeding the bandwidth limit of the input source from which the content is obtained, and decide that solo reproduction is not possible if the bandwidth limit would be exceeded. For example, in step S206 in FIG. 2, the reproducibility determiner 181 may obtain the bit rate (B1) of the content indicated by the content information in the reproduction request information, and the bit rate (B2) at which the input source indicated by the input source information in the reproduction request information is being used on other reproduction channels, and decide whether the sum of these bit rates (B1+B2) exceeds the access bandwidth limit of the input source. If the content is to be reproduced from a BD or DVD, the average bit rate or maximum bit rate recorded as reproduction control information in the reproduction control information file of the BD or DVD may be used as bit rate B1. For audio content recorded in the Moving Picture Experts Group Audio Layer-3 (MP3) format, bit rate B1 may be calculated from information such as the sampling rate, quantization level, and channel information recorded in the MP3 file. Tag information attached to MP3 files and the like may also include a bit rate that can be used as bit rate B1.

This scheme can avoid adverse effects such as glitches and reproduction errors on other reproduction channels that are currently reproducing content from the same input source. This scheme is particularly relevant to devices such as hard disk drives, SD cards, and USB memory devices that permit random access. Such devices can be accessed simultaneously from multiple reproduction channels, each reading audio-video data for different content, but each such device has an access bandwidth limit. If newly requested content is reproduced from such a device when other content is already being reproduced on another reproduction channel, the transfer of data in the other channel may become so slow that decoder underflow occurs, causing serious reproduction errors.

In short, this scheme assures that when content is actually reproduced, the input source has enough bandwidth to reproduce the content normally.

(g) Similarly, if the requested content is network content, then in determining whether or not solo reproduction is possible, the control unit 180 may determine whether the network bandwidth needed for solo reproduction of the content can be obtained, and decide that solo reproduction is not possible if the necessary network bandwidth cannot be obtained. For example, in step S206 in FIG. 2, if the input source information in the reproduction request information indicates that the requested content is network content, the reproducibility determiner 181 may monitor the bandwidth usage of the network connection or connections currently in use, and decide that solo reproduction is not possible if the necessary amount of additional bandwidth is unavailable.

This scheme assures that when content is reproduced from a network source, the network has enough bandwidth for normal reproduction. It also prevents adverse effects such as noise, glitches, or reproduction errors on other channels that are currently using the same network or network device.

(h) When causing one of the output controllers to output a list of content, the control unit 180 may determine whether each item of content in the list can be reproduced by a decoding processor that is not currently being used for other decoding processing (or whether solo reproduction of the content is possible), or determine whether or not the content is identical to content already being reproduced (or whether shared reproduction of the content is possible), and cause the output controller to output information indicating the result of one or both of these determinations. For example, when the control unit 180 causes an output unit to display a playlist, it may also have the output unit display information indicating the reproduction mode options for each item of content on the list. FIG. 10 shows an example of such a list with circles (meaning Yes) and crosses (meaning No) displayed to indicate the modes in which each of six content items C11 to C16 can be reproduced.

This scheme enables the user to know in advance whether solo reproduction and shared reproduction are possible for each content item. This is convenient because it makes it easier for the user to find reproducible content.

(i) When the control unit 180 receives an instruction to reproduce content, even if solo reproduction is possible, if the content is already being reproduced on another channel, the control unit 180 may reproduce the content by shared reproduction. In one scheme, a user may request shared reproduction of content. When the instruction reception unit 170 receives such a request, the control unit 180 determines whether the requested content is being output on another output unit, and if so, initiates shared output of the content to the output unit for which the request was received. In the list in FIG. 10, for example, shared output is possible for content C11-C15. The user can specifically request shared output of one of these content items, and the control unit 180 will honor the request.

If solo reproduction of content C11 is currently in progress on the first reproduction channel while the second and third reproduction channels are idle, for example, then if the user of the second reproduction channel gives an instruction for shared output of content C11, the control unit 180 designates the input source selector and decoding processor currently being used to reproduce content C11 as the input source selector and decoding processor of the second reproduction channel, and output controller 132 as the output controller of the second reproduction channel, and uses these units to conduct shared reproduction of content C11 on the second output unit 142.

(j) Since the reproducing device 100 does not need to decode audio-video signals supplied from the external input device 11 and portable AV device 14, the decoding processors in the configuration described above pass these signals to their destination output controllers without performing any decoding process. Routing these signals through the decoders is advantageous in that instructions to start and stop reproduction can be processed without having to check whether or not the content requires decoding, but such routing is also inefficient in that the decoding processors are not actually being used.

In an alternative scheme, when the control unit 180 is instructed to reproduce content that does not require decoding (or does not require decoding in the reproducing device 100), it designates a virtual decoding processor as the decoding processor for use on the reproduction channel. When an instruction to reproduce content that does not require decoding is given, for example, after deciding that there is a decoder available for use in step S204 in FIG. 2, the control unit 180 reserves the virtual decoding processor in step S205, and designates a reproduction path including the virtual decoding processor in step S221. In this case, the input source selector in the reproduction path may output the audio-video signal to the output controller in the reproduction path instead of the decoding processor. Alternatively, the virtual decoding processor may have the signal passing function of a decoding processor without the decoding function.

Figure 11:
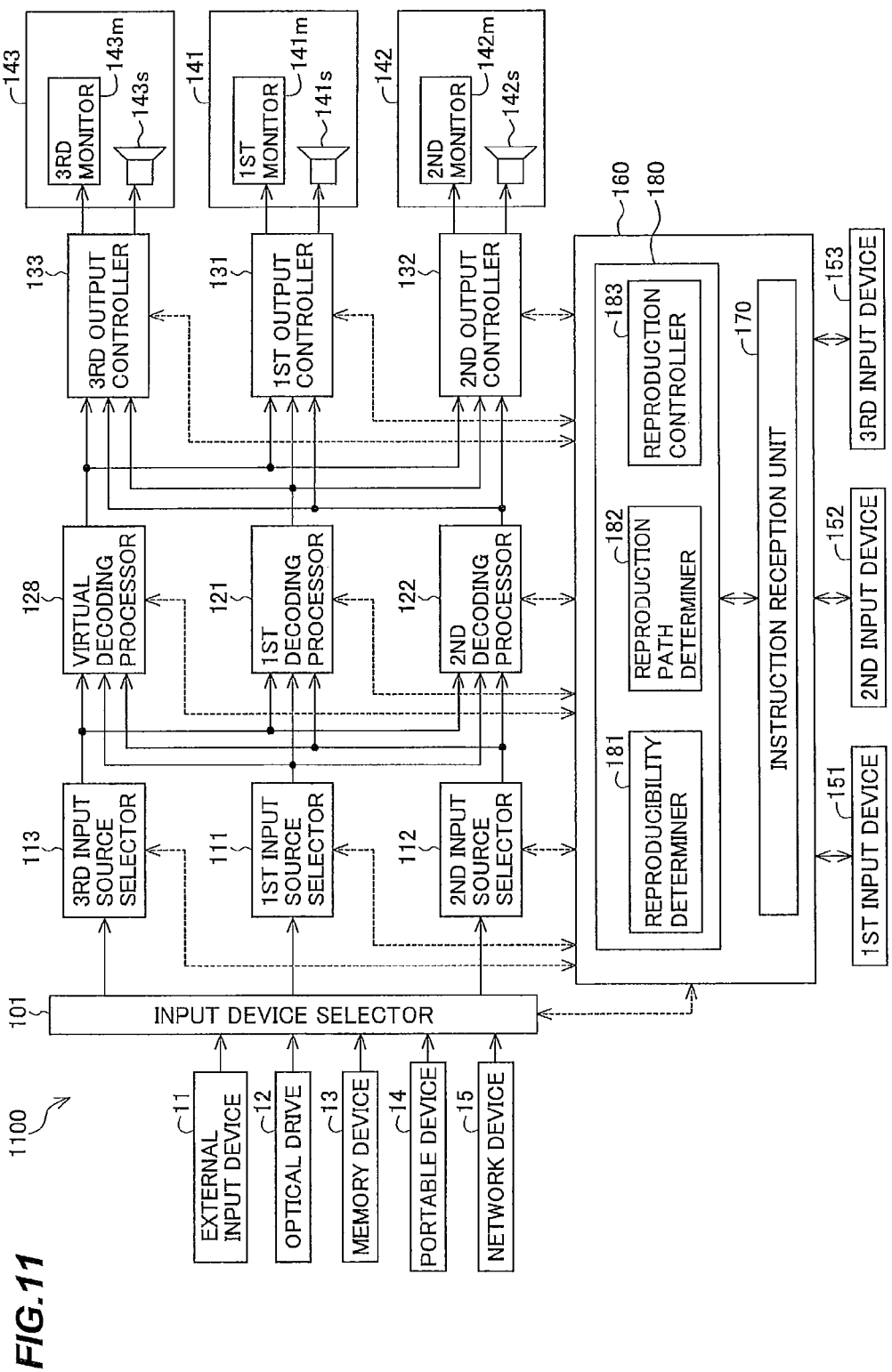
FIG. 11 is a block diagram illustrating the structure of a reproducing device in a variation of the first embodiment.

FIG. 11 shows an exemplary configuration of a reproducing device 1100 employing this scheme, obtained by adding a third input source selector 113 and a virtual decoding processor 128 to the configuration in FIG. 1. Although only one virtual decoding processor is shown, more virtual decoding processors may be provided. For example, three virtual decoding processors may be provided, one for each reproduction channel.

This scheme is more efficient in that the virtual decoding processors can be used to reproduce content not requiring decoding, leaving the decoding processors available to reproduce content that does require decoding.

Second Embodiment

Figure 12:
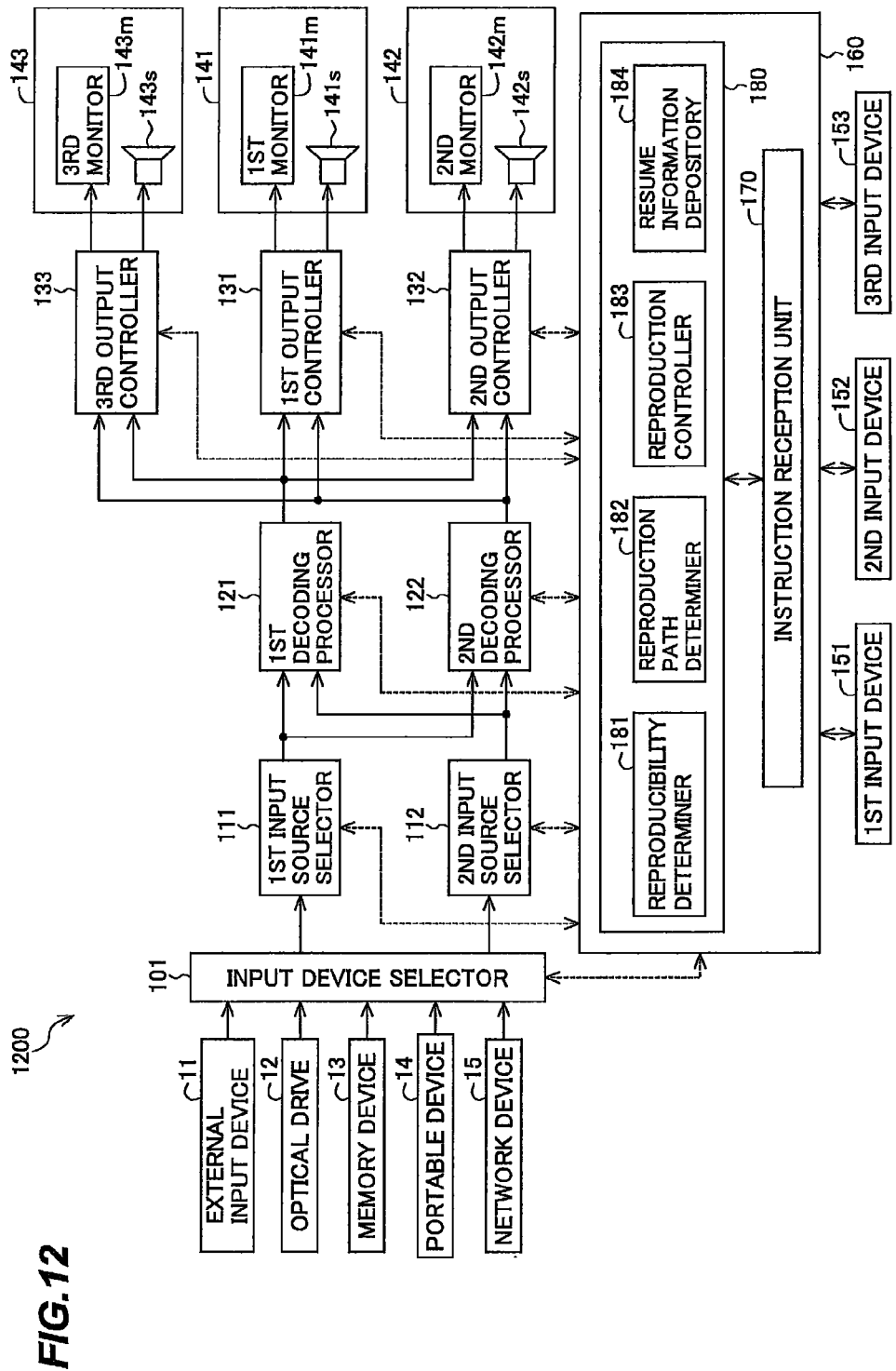
FIG. 12 is a block diagram illustrating the structure of a reproducing device in a second embodiment.

Referring to FIG. 12, the reproducing device 1200 in the second embodiment differs from the reproducing device 100 in the first embodiment in regard to the processing performed by the control unit, but is similar to the reproducing device 100 in the first embodiment in other respects.

In the second embodiment, when the control unit 180 receives an instruction for special reproduction of content that is being reproduced in the shared mode, the control unit 180 determines whether solo reproduction of the content is possible. If solo reproduction is possible, the control unit 180 stores information indicating the current point of reproduction in the content, effects a switchover to the solo mode, then begins special reproduction of the content from the point indicated by the stored information on the output unit to which the special reproduction instruction pertains.

In the example in FIG. 12, the control unit 180 has a resume information depository 184 in addition to the reproducibility determiner 181, reproduction path determiner 182, and reproduction controller 183. When a switchover from shared reproduction to solo reproduction takes place in response to an instruction for special reproduction, the resume information depository 184 holds resume information indicating the position in the content at which the switchover took place, so that special reproduction can begin from that position.

Figure 13:
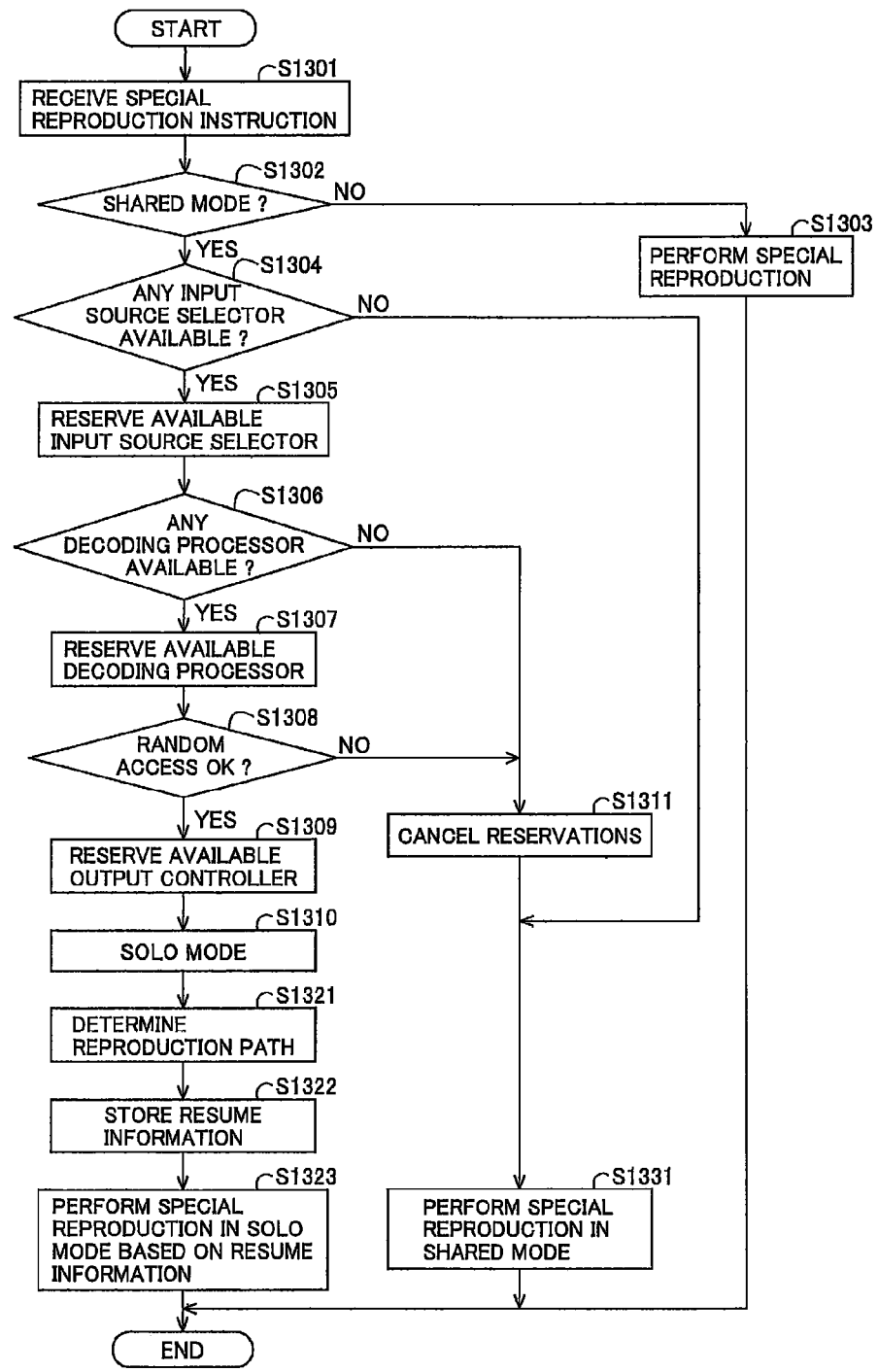
FIG. 13 is a flowchart illustrating an operating procedure followed by the control device in the second embodiment.

The operation of the control section 160 when an instruction for special reproduction is received will be described with reference to the flowchart in FIG. 13.

When the instruction reception unit 170 receives an instruction for special reproduction from one of the input units 151, 152, 153 (step S1301), it sends special reproduction request information to the reproduction controller 183. The special reproduction request information includes input unit information identifying the input unit from which the instruction is received.

When the reproduction controller 183 receives special reproduction request information from the instruction reception unit 170, it determines whether or not the reproduction channel corresponding to the input unit identified by the input unit information (the reproduction channel to which the special reproduction instruction pertains) is currently operating in the shared mode (step S1302).

If this reproduction channel is not operating in the shared mode (No in step S1302), the reproduction controller 183 controls the reproduction channel to which the instruction for special reproduction pertains so that special reproduction is carried out as instructed (step S1303).

If the reproduction channel is operating in the shared mode (Yes in step S1302), the reproduction controller 183 queries the reproducibility determiner 181 to find out whether or not solo reproduction of the content to which the instruction for special reproduction applies is possible in the reproduction channel to which the special reproduction instruction pertains.

When thus queried by the reproduction controller 183, the reproducibility determiner 181 checks the usage status of all the input source selectors and decides whether one is available for use (step S1304). If no input source selector is available (No in step S1304), the reproducibility determiner 181 informs the reproduction controller 183 that solo reproduction is not possible and the procedure advances to step S1331. If an input source selector is available (Yes in step S1304), the reproducibility determiner 181 reserves an available input source selector (step S1305).

After reserving an input source selector, the reproducibility determiner 181 checks the usage status of all the decoding processors and decides whether one is available for use (step S1306). If no decoding processor is available (No in step S1306), the reproducibility determiner 181 cancels the reservation made in step S1305 (step S1311) and informs the reproduction controller 183 that solo reproduction is not possible, and the procedure advances to step S1331. If a decoding processor is available (Yes in step S1306), the reproducibility determiner 181 reserves an available decoding processor (step S1307).

After reserving a decoding processor, the reproducibility determiner 181 decides whether the input source of the content to which the instruction for special reproduction applies permits solo reproduction, that is, whether the input source permits random access (step S1308). If the input source does not permit solo reproduction (No in step S1308), the reproducibility determiner 181 cancels the reservations made in steps S1305 and S1307 (step S1311) and informs the reproduction controller 183 that solo reproduction is not possible, and the procedure advances to step S1331. If the input source permits solo reproduction (Yes in step S1308), then solo output is possible and the reproducibility determiner 181 reserves the output controller of the output unit in the reproduction channel to which the instruction for special reproduction applies (step S1309).

After the reservation of an input source selector, a decoding processor, and an output controller is completed in step S1309, the reproducibility determiner 181 switches the reproduction mode to the solo mode (step S1310) and sends reproduction mode information indicating that the solo mode is available for use to the reproduction path determiner 182. The procedure now advances to step S1321.

In step S1321, when the reproduction path determiner 182 receives reproduction mode information indicating that the solo mode is available for use, it selects a reproduction path for the reproduction channel to which the instruction for special reproduction pertains. Specifically, the reproduction path determiner 182 enters the input source selector, decoding processor, and output controller reserved in the preceding steps in the resource management table as resources to be used on the reproduction channel to which the special reproduction instruction pertains. The reproduction path determiner 182 then informs the reproduction controller 183 of the reproduction path, and the procedure advances to step S1322.

In step S1322, the reproduction controller 183 stores resume information in the resume information depository 184. The resume information indicates the input source of the content that was being reproduced in the shared mode on the reproduction channel to which the special reproduction instruction pertains and the point in the content at which the content was being reproduced.

In step S1323, the reproduction controller 183 sends the reproduction path determiner 182 a request for resource management information concerning the reproduction channel on which special reproduction has been requested. On the basis of this information, the reproduction controller 183 sets the resources (input source selector, decoding processor, and output controller) of the reproduction channel to which the special reproduction instruction pertains to resume reproduction of the content to which the special reproduction instruction pertains in the solo mode. These settings cause the input source selector, decoding processor, and output controller of the reproduction channel to which the special reproduction instruction pertains to begin special reproduction of the content to which the special reproduction instruction pertains from the point indicated by the resume information.

In step S1331, when notified by the reproducibility determiner 181 that solo reproduction is not possible, the reproduction controller 183 leaves the reproduction channel to which the special reproduction instruction pertains in the shared mode and controls its reproduction path to carry out special reproduction per the instruction. Special reproduction then takes place not only on the reproduction channel to which the special reproduction instruction pertains but also on the other reproduction channel or channels engaged in shared reproduction of the same content.

The operation of the reproducing device 1200 when shared reproduction of content C21 is taking place on the second and third reproduction channels and the user of the second reproduction channel (the second user) gives a special reproduction instruction will now be described. It will be assumed that the shared reproduction of content C21 is being carried out by the first input source selector 111 and first decoding processor 121, that the first reproduction channel is idle, and that the second input source selector 112 and second decoding processor 122 are not being used.

When the reproduction controller 183 receives the special reproduction instruction through the second input unit 152 and instruction reception unit 170, since the second reproduction channel is operating in the shared mode, the reproduction controller 183 queries the reproducibility determiner 181 as to whether solo reproduction is possible.

In this example, the reproducibility determiner 181 decides that solo reproduction is possible, switches the second reproduction channel over to the solo mode, and sends the reproduction path determiner 182 reproduction mode information indicating that the shared mode is available for use.

On the basis of the reproduction mode information received from the reproducibility determiner 181, the reproduction path determiner 182 designates a reproduction path including the second input source selector 112, second decoding processor 122, and second output controller 132 as the reproduction path of the second reproduction channel, and informs the reproduction controller 183 of this reproduction path.

Upon receiving this reproduction path notification from the reproduction path determiner 182, the reproduction controller 183 stores resume information indicating the input source S1 of the content C21 being reproduced in the shared mode and the current reproduction point in content C21 in the resume information depository 184. The reproduction controller 183 then controls the second input source selector 112, second decoding processor 122, and second output controller 132 so that they begin special reproduction of content C21 in the solo mode, from the reproduction point indicated in the stored resume information.

When the second reproduction channel is switched over to the solo mode, the third reproduction channel is also switched over to the solo mode, and continues reproducing content C21 in the solo mode, without switching to special reproduction.

This sequence of operations is illustrated by the timing diagram in FIG. 14. The first reproduction channel is not shown because it remains idle throughout the sequence.

In the first interval W in FIG. 14, the second and third reproduction channels are also idle. At the end of interval W, the second user gives an instruction to reproduce content C21 from input source S1, and normal reproduction of content C21 in the solo mode begins on the second reproduction channel in interval X while the third reproduction channel remains idle. At the end of interval X, the third user gives an instruction to reproduce content C21 from input source S1. Operating in an alternative configuration (i) mentioned in the first embodiment, the reproducing device 1200 starts reproducing content C21 in the shared mode on the third reproduction channel in interval Y. A shared reproduction notification 1401 is sent to the second reproduction channel so that during interval Y, normal reproduction of content C21 in the shared mode takes place on both the second and third reproduction channels. At the end of interval Y, the second user gives an instruction for special reproduction. The reproducing device 1200 reconfigures the second reproduction channel for solo reproduction and begins special reproduction of content C21 from input source S1 in the solo mode in interval Z. A shared reproduction termination notification 1402 is sent to the third reproduction channel, which is switched over to the solo mode and continues normal reproduction of content C21 from input source S1. Accordingly, during interval Z, the second reproduction channel carries out special reproduction of content C21 from input source S1 and the third reproduction channel carries out normal reproduction of content C21 from input source S1, both reproduction channels operating in the solo mode.

In the second embodiment, when an instruction for special reproduction of content by a particular output controller is received, if the content is currently being reproduced in the shared mode, the control unit decides whether solo reproduction of the content is possible. If solo reproduction is possible, the control unit stores information indicating the current reproduction position of the content, and starts special reproduction of the content by the particular output controller from the indicated reproduction position, while other output controllers that were reproducing the same content continue to do so without switching over to special reproduction. This is convenient for the users who did not request special reproduction.

The functions of the control unit in the first and second embodiments may be implemented purely by electronic circuits and other hardware resources, or by combined operation of hardware resources and software resources. In the latter case, the functions may be implemented by execution of a control program by a computing device. The control program may be stored in a recording medium such as a read-only memory (ROM) and executed by a central processing unit (CPU) in the computing device. Alternatively, the control program may be supplied on a computer-readable medium such as an optical disc, or through a communication line or a network such as the Internet.

Those skilled in the art will recognize that further variations are possible within the scope of the invention, which is defined in the appended claims.

What is claimed is:

1. A reproducing device for reproducing plural content supplied from one or more input sources, the reproducing device comprising:
    one or more input source selectors for selecting content to reproduce from among the plural content;
    a plurality of decoding processors for performing a decoding process on the content;
    a plurality of output controllers for reproducing and outputting the content after the decoding process;
    an instruction reception unit for receiving a reproduction instruction specifying arbitrary content from among the plural content, to have the specified content reproduced and output by one of the output controllers;
    a reproducibility determiner for making a decision, when the reproduction instruction is received, on a basis of usage conditions of the one or more input source selectors and the plurality of decoding processors, as to whether or not the specified content can be reproduced with one of the plurality of decoding processors;
    a reproduction path determiner for designating, on a basis of the decision made by the reproducibility determiner, which decoding processor and which output controller to use to reproduce the specified content; and a reproduction controller for using the decoding processor and the output controller designated by the reproduction path determiner to reproduce the specified content;

wherein when first content is already being reproduced by one of the plurality of decoding processors and the instruction reception unit receives a new reproduction instruction for second content, the reproducibility determiner decides that the second content cannot be reproduced with another one of the decoding processors, differing from the decoding processor being used to reproduce the first content, when at least one of the following is satisfied:

there is no input source selector that can demultiplex the second content and is not currently being used for reproduction, there is no decoding processor that can decode the second content and is not currently being used for reproduction, the second content is supplied from an input source, among the one or more input sources, that is currently being used for reproduction and is incapable of multiple output, the second content is supplied from an input source, among the one or more input sources, having an access bandwidth limit that would be exceeded if the second content were to be reproduced with said another one of the decoding processors, and when the second content is network content and network bandwidth needed for reproducing the second content is not obtainable.

2. The reproducing device of claim 1, wherein when the reproducibility determiner decides that the second content cannot be reproduced with said another one of the decoding processors, the reproducibility determiner decides whether or not the second content is identical to the first content.

3. The reproducing device of claim 2, wherein when the reproducibility determiner decides that the second content is identical to the first content, the reproduction path determiner designates the decoding processor being used to reproduce the first content as the decoding processor to use to reproduce the second content, and the reproduction controller reproduces the second content by using the decoding processor being used to reproduce the first content.

4. The reproducing device of claim 2, wherein when causing one of the plurality of the output controllers to output a list of content, for each item of content on the list, the reproducing device determines whether the item can be reproduced using one of the decoding processors not already being used for reproduction and/or whether the item is identical to content already being reproduced, and causes said one of the output controllers to output information indicating the result of the determinations.

5. The reproducing device of claim 2, wherein when the reproduction path determiner decides to have at least two of the plurality of output controllers reproduce and output content processed by one of the plurality of decoding processors, the reproduction controller causes each of the at least two output controllers to output information indicating that identical content is being reproduced by multiple output controllers.

6. The reproducing device of claim 2, wherein when the reproduction path determiner decides to have a first output controller and a second output controller among the plurality of output controllers both reproduce and output content processed by one of the plurality of decoding processors and the instruction reception unit receives an instruction to have the second output controller perform special reproduction, the reproducibility determiner decides whether or not said content can be reproduced with another one of the decoding processors differing from the decoding processor already being used to reproduce said content and the second output controller, and if said content can be reproduced with said another one of the decoding processors, the reproduction controller stores information indicating a position in said content at which said content is currently being reproduced, and causes said another one of the decoding processors and the second output controller to begin special reproduction of said content from the position indicated by the stored information.

7. The reproducing device of claim 1, wherein when causing one of the plurality of the output controllers to output a list of content, for each item of content on the list, the reproducing device determines whether the item can be reproduced using one of the decoding processors not already being used for reproduction and/or whether the item is identical to content already being reproduced, and causes said one of the output controllers to output information indicating the result of the determinations.

8. The reproducing device of claim 1, wherein when the reproduction path determiner decides to have at least two of the plurality of output controllers reproduce and output content processed by one of the plurality of decoding processors, the reproduction controller causes each of the at least two output controllers to output information indicating that identical content is being reproduced by multiple output controllers.

9. The reproducing device of claim 1, wherein when the reproduction path determiner decides to have a first output controller and a second output controller among the plurality of output controllers both reproduce and output content processed by one of the plurality of decoding processors and the instruction reception unit receives an instruction to have the second output controller perform special reproduction, the reproducibility determiner decides whether or not said content can be reproduced with another one of the decoding processors differing from the decoding processor already being used to reproduce said content and the second output controller, and if said content can be reproduced with said another one of the decoding processors, the reproduction controller stores information indicating a position in said content at which said content is currently being reproduced, and causes said another one of the decoding processors and the second output controller to begin special reproduction of said content from the position indicated by the stored information.

10. The reproducing device of claim 1, wherein when the reproducibility determiner decides that the second content can be reproduced with said another one of the decoding processors, the reproduction path determiner designates said another one of the plurality of decoding processors as the decoding processor to use to reproduce the second content, and the reproduction controller performs the reproduction of the second content using the decoding processor thus designated.

11. The reproducing device of claim 10, wherein when causing one of the plurality of the output controllers to output a list of content, for each item of content on the list, the reproducing device determines whether the item can be reproduced using one of the decoding processors not already being used for reproduction and/or whether the item is identical to content already being reproduced, and causes said one of the output controllers to output information indicating the result of the determinations.

12. The reproducing device of claim 10, wherein when the reproduction path determiner decides to have at least two of the plurality of output controllers reproduce and output content processed by one of the plurality of decoding processors, the reproduction controller causes each of the at least two output controllers to output information indicating that identical content is being reproduced by multiple output controllers.

13. The reproducing device of claim 10, wherein when the reproduction path determiner decides to have a first output controller and a second output controller among the plurality of output controllers both reproduce and output content processed by one of the plurality of decoding processors and the instruction reception unit receives an instruction to have the second output controller perform special reproduction, the reproducibility determiner decides whether or not said content can be reproduced with another one of the decoding processors differing from the decoding processor already being used to reproduce said content and the second output controller, and if said content can be reproduced with said another one of the decoding processors, the reproduction controller stores information indicating a position in said content at which said content is currently being reproduced, and causes said another one of the decoding processors and the second output controller to begin special reproduction of said content from the position indicated by the stored information.

14. A control method for a reproducing device for reproducing plural content supplied from one or more input sources, the reproducing device including one or more input source selectors for selecting content to reproduce from among the plural content, a plurality of decoding processors for performing a decoding process on the content, and a plurality of output controllers for reproducing and outputting the content after the decoding process, the control method comprising:
   receiving a reproduction instruction specifying arbitrary content from among the plural content, to have the specified content reproduced and output by one of the output controllers;
   deciding, on a basis of usage conditions of the one or more input source selectors and the plurality of decoding processors, whether or not the specified content can be reproduced with one of the plurality of decoding processors;
   designating, on a basis of the decision, which decoding processor and which output controller to use to reproduce the specified content; and
   using the designated decoding processor and the designated output controller to reproduce the specified content; wherein
   when first content is already being reproduced by one of the plurality of decoding processors and a new reproduction instruction for second content is received, it is decided that the second content cannot be reproduced with another one of the decoding processors, differing from the decoding processor being used to reproduce the first content, when at least one of the following is satisfied:
      there is no input source selector that can demultiplex the second content and is not currently being used for reproduction,
      there is no decoding processor that can decode the second content and is not currently being used for reproduction,
      the second content is supplied from an input source, among the one or more input sources, that is currently being used for reproduction and is incapable of multiple output,
      the second content is supplied from an input source, among the one or more input sources, having an access bandwidth limit that would be exceeded if the second content were to be reproduced with said another one of the decoding processors, and
      when the second content is network content and network bandwidth needed for reproducing the second content is not obtainable.

15. The control method of claim 14, wherein when it is decided that the second content can be reproduced with said another one of the decoding processors, the designating includes designating said another one of the plurality of decoding processors as the decoding processor to use to reproduce the second content.

16. A control method for a reproducing device for reproducing plural content supplied from one or more input sources, the reproducing device including one or more input source selectors for selecting content to reproduce from among the plural content, a plurality of decoding processors for performing a decoding process on the content, and a plurality of output controllers for reproducing and outputting the content after the decoding process, the control method comprising:
   receiving a reproduction instruction specifying arbitrary content from among the plural content, to have the specified content reproduced and output by one of the output controllers;
   deciding, on a basis of usage conditions of the one or more input source selectors and the plurality of decoding processors, whether or not the specified content can be reproduced with one of the plurality of decoding processors;
   designating, on a basis of the decision, which decoding processor and which output controller to use to reproduce the specified content; and
   using the designated decoding processor and the designated output controller to reproduce the specified content; wherein
   when first content is already being reproduced by one of the plurality of decoding processors and a new reproduction instruction for second content is received, the deciding includes deciding whether or not the second content can be reproduced with another one of the decoding processors, differing from the decoding processor being used to reproduce the first content; and
   when it is decided that the second content cannot be reproduced with said another one of the decoding processors, the deciding includes deciding whether or not the second content is identical to the first content.

17. A machine-readable recording medium storing a control program for a reproducing device for reproducing plural content supplied from one or more input sources, the reproducing device including one or more input source selectors for selecting content to reproduce from among the plural content, a plurality of decoding processors for performing a decoding process on the content, and a plurality of output controllers for reproducing and outputting the content after the decoding process, the control program comprising:
   instructions for receiving a reproduction instruction specifying arbitrary content from among the plural content and specifying one of the plurality of output controllers, in order to have the specified output controller reproduce and output the specified content;

instructions for deciding, on a basis of usage conditions of the one or more input source selectors and the plurality of decoding processors, whether or not the specified content can be reproduced with one of the plurality of decoding processors;

instructions for designating, on a basis of the decision, which decoding processor and which output controller to use to reproduce the specified content; and instructions for using the designated decoding processor and the designated output controller to reproduce the specified content; wherein when first content is already being reproduced by one of the plurality of decoding processors and a new reproduction instruction for second content is received, the instructions for deciding decides that the second content cannot be reproduced with another one of the decoding processors, differing from the decoding processor being used to reproduce the first content, when at least one of the following is satisfied:

there is no input source selector that can demultiplex the second content and is not currently being used for reproduction, there is no decoding processor that can decode the second content and is not currently being used for reproduction, the second content is supplied from an input source, among the one or more input sources, that is currently being used for reproduction and is incapable of multiple output, the second content is supplied from an input source, among the one or more input sources, having an access bandwidth limit that would be exceeded if the second content were to be reproduced with said another one of the decoding processors, and when the second content is network content and network bandwidth needed for reproducing the second content is not obtainable.

18. The machine-readable recording medium of claim 17, wherein when it is decided that the second content can be reproduced with said another one of the decoding processors, the instructions for designating includes instructions for designating said another one of the plurality of decoding processors as the decoding processor to use to reproduce the second content.

19. A machine-readable recording medium storing a control program for a reproducing device for reproducing plural content supplied from one or more input sources, the reproducing device including one or more input source selectors for selecting content to reproduce from among the plural content, a plurality of decoding processors for performing a decoding process on the content, and a plurality of output controllers for reproducing and outputting the content after the decoding process, the control program comprising:

instructions for receiving a reproduction instruction specifying arbitrary content from among the plural content and specifying one of the plurality of output controllers, in order to have the specified output controller reproduce and output the specified content;

instructions for deciding, on a basis of usage conditions of the one or more input source selectors and the plurality of decoding processors, whether or not the specified content can be reproduced with one of the plurality of decoding processors;

instructions for designating, on a basis of the decision, which decoding processor and which output controller to use to reproduce the specified content; and instructions for using the designated decoding processor and the designated output controller to reproduce the specified content; wherein when first content is already being reproduced by one of the plurality of decoding processors and a new reproduction instruction for second content is received, the instructions for deciding includes instructions for deciding whether or not the second content can be reproduced with another one of the decoding processors, differing from the decoding processor being used to reproduce the first content; and when it is decided that the second content cannot be reproduced with said another one of the decoding processors, the instructions for deciding includes instructions for deciding whether or not the second content is identical to the first content.

* * * * *